(12) United States Patent
Zebuhr

(10) Patent No.: US 7,368,039 B2
(45) Date of Patent: May 6, 2008

(54) DISTILLER EMPLOYING CYCLICAL EVAPORATION-SURFACE WETTING

(75) Inventor: William H. Zebuhr, Nashua, NH (US)

(73) Assignee: Zanaqua Technologies, Inc., Hudson, NH (US)

(*) Notice: Subject to any disclaimer, the term of this patent is extended or adjusted under 35 U.S.C. 154(b) by 565 days.

(21) Appl. No.: 10/864,746

(22) Filed: Jun. 9, 2004

(65) Prior Publication Data

US 2004/0222079 A1 Nov. 11, 2004

Related U.S. Application Data

(62) Division of application No. 09/765,263, filed on Jan. 18, 2001, now Pat. No. 6,802,941.

(51) Int. Cl.
*B01D 1/16* (2006.01)
*B01D 3/42* (2006.01)

(52) U.S. Cl. .............. 203/1; 203/25; 203/26; 203/71; 203/90

(58) Field of Classification Search ............ 203/1, 203/71, 24–26, 90, 100; 239/13
See application file for complete search history.

(56) References Cited

U.S. PATENT DOCUMENTS

| | | | |
|---|---|---|---|
| 2,425,813 A | 8/1947 | Kuntz | 230/217 |
| 2,703,310 A | 3/1955 | Kretchmar | 202/205 |
| 2,894,879 A | 7/1959 | Hickman | 202/45 |
| 2,899,366 A | 8/1959 | Hickman | |
| 3,136,707 A | 6/1964 | Hickman | |
| 3,200,050 A | 8/1965 | Hogan et al. | |
| 3,245,883 A | 4/1966 | Loebel | |
| 3,619,379 A | 11/1971 | Bidard | 202/174 |
| 3,637,465 A | 1/1972 | Wilson | 203/11 |

(Continued)

FOREIGN PATENT DOCUMENTS

DE 714705 11/1941

(Continued)

OTHER PUBLICATIONS

"What is . . . Distillation" www.goodwaterco.com; Aug. 19, 2004.

(Continued)

*Primary Examiner*—Virginia Manoharan
(74) *Attorney, Agent, or Firm*—Foley Hoag LLP

(57) ABSTRACT

A distillation unit (10) employs a rotary heat exchanger (32) forming a multiplicity of evaporation chambers (56) into which a liquid to be purified is sprayed for evaporation. Spray arms (58) spray at a steady rate into all of the evaporation chambers (56) simultaneously but not at a rate that is adequate to maintain the wetting required for efficient transfer of heat to the liquid. A scanning sprayer (140) supplements this steady spray with spray from nozzles (142 and 144) into only a few of the evaporation chambers at a time, visiting all of them cyclically. The overall rate of spray from the two sources thus combined to spray the chamber cyclically maintains proper wetting even though on average it is lower than the rate that would be required of a constant-rate spray into all of the evaporation chambers.

8 Claims, 18 Drawing Sheets

U.S. PATENT DOCUMENTS

| | | | |
|---|---|---|---|
| 3,680,778 A | 8/1972 | Sisson et al. | 239/100 |
| 3,719,227 A | 3/1973 | Jenssen | 165/166 |
| 3,721,346 A | 3/1973 | Lore et al. | 210/121 |
| 3,734,177 A | 5/1973 | Bellovary et al. | 165/166 |
| 3,764,483 A | 10/1973 | Tleimat | 202/236 |
| 3,829,945 A | 8/1974 | Kanzler et al. | 29/157.3 D |
| 3,861,222 A | 1/1975 | Braun et al. | 74/44 |
| 3,864,252 A | 2/1975 | Morin et al. | 210/59 |
| 3,880,668 A | 4/1975 | Miller | 127/9 |
| 3,890,205 A | 6/1975 | Schnitzer | 202/236 |
| 3,895,926 A * | 7/1975 | Lerner | 95/219 |
| 4,017,354 A | 4/1977 | Marchenko et al. | 159/6.1 |
| 4,038,129 A | 7/1977 | Wreszinski | 159/4.04 |
| 4,054,493 A | 10/1977 | Roller | 203/7 |
| 4,125,946 A | 11/1978 | Prager | 34/80 |
| 4,129,014 A | 12/1978 | Chubb | 62/333 |
| 4,133,484 A | 1/1979 | Jannone | 239/214.25 |
| 4,198,360 A | 4/1980 | Shafranovsky et al. | 202/236 |
| 4,235,679 A | 11/1980 | Swaidan | 202/234 |
| 4,267,021 A | 5/1981 | Speros et al. | 202/176 |
| 4,270,981 A | 6/1981 | Stark | 202/172 |
| 4,283,255 A | 8/1981 | Ramshaw et al. | 159/6.1 |
| 4,348,261 A | 9/1982 | Saari | 203/25 |
| 4,402,793 A | 9/1983 | Petrek et al. | 202/174 |
| 4,413,474 A | 11/1983 | Moscrip | 60/517 |
| 4,432,913 A * | 2/1984 | Harper et al. | 261/97 |
| 4,465,559 A | 8/1984 | Won | 203/90 |
| 4,504,361 A | 3/1985 | Tkac et al. | 202/172 |
| 4,584,064 A | 4/1986 | Ciais et al. | 206/89 |
| 4,585,523 A | 4/1986 | Giddings | 202/236 |
| 4,585,524 A | 4/1986 | Hoiss | 203/11 |
| 4,586,985 A | 5/1986 | Ciocca et al. | 202/174 |
| 4,671,856 A | 6/1987 | Sears | 203/22 |
| 4,683,026 A | 7/1987 | Feres | 159/6.1 |
| 4,707,220 A | 11/1987 | Feres | 159/6.1 |
| 4,731,159 A | 3/1988 | Porter et al. | 159/6.1 |
| 4,778,566 A | 10/1988 | Vinz | 202/153 |
| 5,009,085 A | 4/1991 | Ramshaw et al. | 62/476 |
| 5,045,155 A | 9/1991 | Ramsland | 202/174 |
| 5,094,721 A | 3/1992 | Petrek | 203/22 |
| 5,152,461 A | 10/1992 | Proctor | 239/304 |
| 5,333,677 A | 8/1994 | Molivadas | 165/272 |
| 5,409,576 A | 4/1995 | Tleimat | 202/174 |
| 5,411,640 A | 5/1995 | Ramsland | 202/174 |
| 5,587,054 A | 12/1996 | Keith | 202/182 |
| 5,601,688 A | 2/1997 | Assaf et al. | 159/44 |
| 5,628,879 A | 5/1997 | Woodruff | 202/234 |
| 5,671,716 A | 9/1997 | Hetrick et al. | 123/491 |
| 5,720,177 A | 2/1998 | Derrick et al. | 62/115 |
| 5,770,020 A | 6/1998 | Koistinen et al. | 202/172 |
| 5,810,975 A | 9/1998 | Bourdel | 202/176 |
| 5,810,976 A | 9/1998 | Keith | 202/182 |
| 6,217,176 B1 | 4/2001 | Maekawa | 359/601 |
| 6,238,524 B1 | 5/2001 | Zebuhr | 202/234 |
| 6,258,215 B1 | 7/2001 | Samsonov et al. | 202/176 |
| 6,261,419 B1 | 7/2001 | Zebuhr | 202/172 |
| 6,293,121 B1 | 9/2001 | Labrador | 62/304 |
| 6,375,803 B1 | 4/2002 | Razzaghi et al. | 203/1 |
| 2002/0092757 A1 | 7/2002 | Zebuhr | 202/172 |
| 2002/0092758 A1 | 7/2002 | Zebuhr | 202/172 |
| 2003/0213248 A1 | 11/2003 | Osborne et al. | 60/670 |

FOREIGN PATENT DOCUMENTS

| | | |
|---|---|---|
| FR | 803938 | 10/1936 |
| GB | 263053 | 12/1926 |
| GB | 757085 | 9/1956 |
| NO | 213478 | 2/1941 |
| SU | 1451437 | 1/1989 |
| SU | 1590863 | 9/1990 |

OTHER PUBLICATIONS

Butuzov, Pukhovoy and Rifert, *Experimental Determination of the Minimum Irrigation Density in a Thin-Film Rotating Disk Apparatus*, Fluid Mechanics—Soviet Research, vol. 5, No. 1, Jan.-Feb. 1976.

* cited by examiner

DISTILLER EMPLOYING CYCLICAL EVAPORATION-SURFACE WETTING

CROSS-REFERENCE TO RELATED APPLICATIONS

This application is a divisional of U.S. patent application Ser. No. 09/765,263, which was filed on Jan. 18, 2001, by William H. Zebuhr for Distiller Em-ploying Cyclical Evaporation-Surface Wetting and has now issued as U.S. Pat. No. 6,802,941. It is also related to commonly as-signed U.S. Pat. No. 6,689,251 to William H. Zebuhr entitled Cycled-Concentration Distiller, U.S. patent application Ser. No. 09/765,260 of William H. Zebuhr entitled Distiller Employing Separate Condensate and Concentrate Heat-Exchange Paths, abandoned U.S. patent application Ser. No. 09/765,261 of William H. Zebuhr entitled Rotary Evaporator Employing Self-Driven Recirculation, and U.S. patent application Ser. No. 09/765,475 of William H. Zebuhr entitled Distiller Employing Recirculant-Flow Filter Flushing, all of which were filed on Jan. 18, 2001, and are hereby incorporated by reference.

BACKGROUND OF THE INVENTION

1. Field of the Invention

The present invention is directed to distillation. It has particular, but not exclusive, application to using rotary heat exchangers to purify water by distillation.

2. Background Information

One of the most effective techniques for purifying water is to distill it. In distillation, the water to be purified is heated to the point at which it evaporates, and the resultant vapor is then condensed. Since the vapor leaves almost all impurities behind in the input, feed water, the condensate that results is typically of a purity much higher in most respects than the output of most competing purification technologies.

One of the distillation approaches to which the invention to be described below may be applied employs a rotary heat exchanger. Water to be purified is introduced to one, evaporation set of heat-exchange surfaces, from which the liquid absorbs heat and evaporates. The resultant water vapor is then typically compressed and brought into contact with another, condensation set of heat-exchange surfaces that are in thermal communication with the set of evaporation heat-exchange surfaces. Since the water vapor on the condensation side is under greater vapor pressure than the water on the evaporation side, vapor that condenses on the condensation side will be hotter than the evaporating liquid on the evaporation side, and its heat of evaporation will therefore flow to the evaporation side: the system reclaims the heat of evaporization used to remove the relatively pure vapor from the contaminated liquid. To minimize the insulating effects to which a condensation film on the condensation surfaces would tend to contribute, a rotary heat exchanger's heat-exchange surfaces rotate rapidly, so the condensate experiences high centrifugal force and is therefore removed rapidly from the condensation surfaces.

This removal of liquid from the condensation-side heat-exchange surfaces is important, because a significant drawback of using distillation for water purification is the energy cost that it exacts. That cost tends to be greater when the temperature difference between the rotary heat exchanger's evaporation and condensation sides is relatively great. On the other end, a low temperature difference tends to result in a lower rate of heat exchange, and this then necessitates a greater heat-exchange area for a given volume rate of distillation. Such an additional heat-exchange-surface area exacts its own cost penalties not only in initial equipment cost but also in the power needed to operate the unit. The reason why rapid condensate removal tends to ameliorate the energy-cost problem is that reduction of the condensate film's insulating effects tends to increase the heat-exchange rate for a given temperature difference.

The rotary heat exchanger's centrifugal force also tends to reduce the water-film thickness on the evaporation side and thereby further benefit heat-exchange efficiency. Of course, introducing liquid to the evaporation side at too great a rate will compromise the centrifugal force's beneficial effect on heat transfer, so evaporator efficiency is best served by keeping the rate of feed-water introduction relatively low. Unfortunately, too low a rate of feed-water introduction is counterproductive; it allows surface tension to defeat proper surface wetting and thus heat transfer to the liquid.

SUMMARY OF THE INVENTION

But I have recognized that heat-exchanger efficiency can be improved by employing a technique that keeps the evaporator surfaces substantially wetted but uses an average rate of liquid feed substantially lower than the steady-state rate required to maintain proper wetting. In accordance with my invention, the rate at which the evaporator-side heat-exchange surfaces are irrigated so varies as repeatedly to reach a peak irrigation rate that is at least twice its average rate. Preferably, that average rate is less than half the steady-state rate required to maintain proper wetting, while the peak rate preferably exceeds that steady-state rate. Even though the average rate is low, the repeated increases to such a peak rate can prevent those surfaces from dewetting. The result is a significantly greater heat-exchange rate, and less power consumption, than in a similar system employing the minimum steady-state rate required to maintain wetting.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
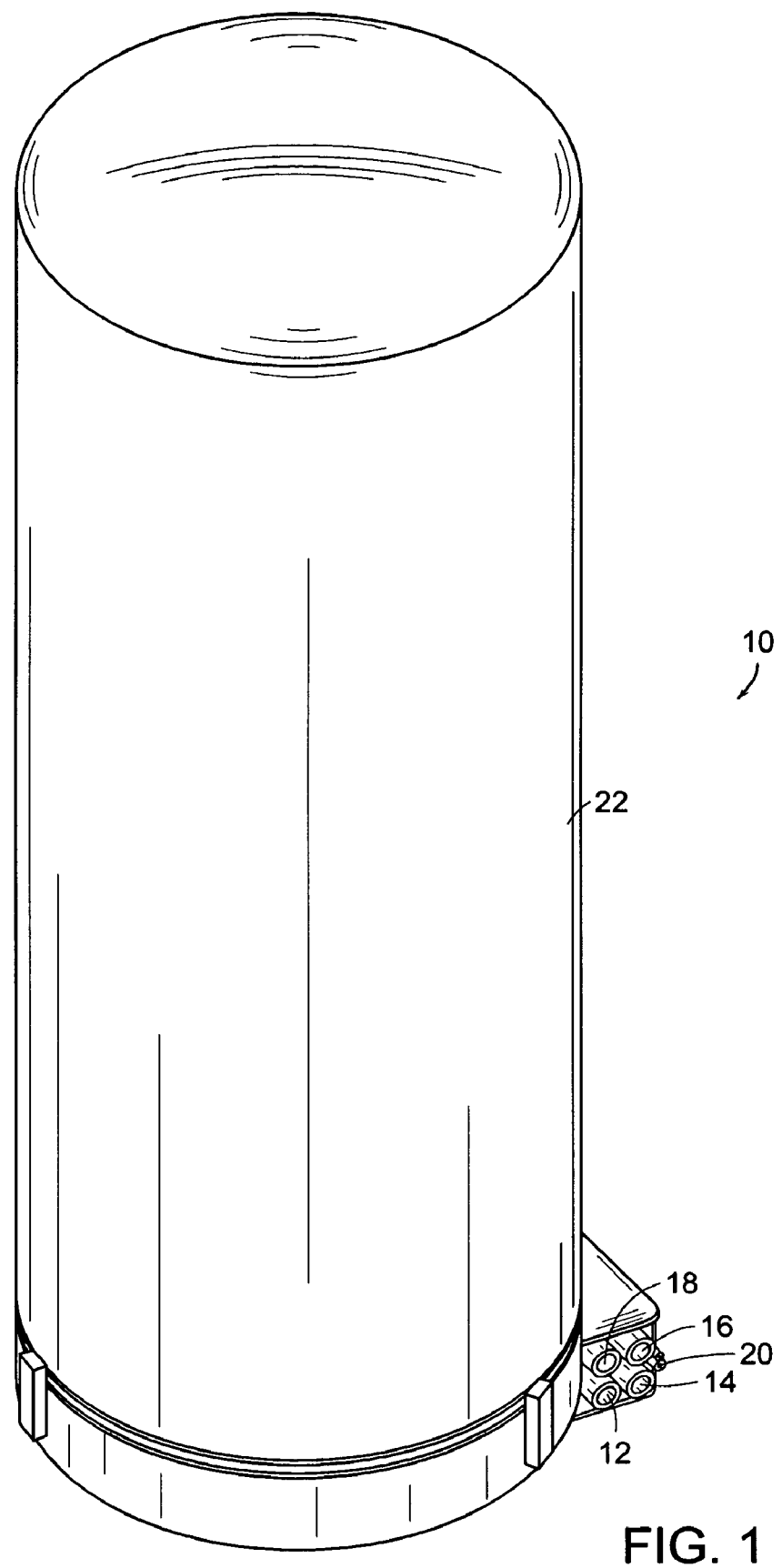
FIG. 1 is a front isometric view of a distillation unit that employs the present invention's teachings.

FIG. 1 is an exterior isometric view of a distillation unit in which the present invention's heat-exchanger-irrigation approach can be employed. In general, the distillation unit 10 includes a feed inlet 12 through which the unit draws a feed liquid to be purified, typically water containing some contamination. The unit 10 purifies the water, producing a pure condensate at a condensate outlet 14. The volume rate of condensate produced by the unit 10 will in most cases be only slightly less than that of the feed liquid entering inlet 12, nearly all the remainder being a small stream of concentrated impurities discharged through a concentrate outlet 16. The unit also may include a safety-drain outlet 18. The illustrated unit is powered by electricity, and it may be remotely controlled or monitored. For this reason, electrical cables 20 are also provided. In the illustrated embodiment, the distillation unit 10 is intended for high-efficiency use, so it includes an insulating housing 22. But the present invention's teachings are applicable to a wide range of heat-exchanger applications, not all of which would typically employ such a housing.

Figure 2:
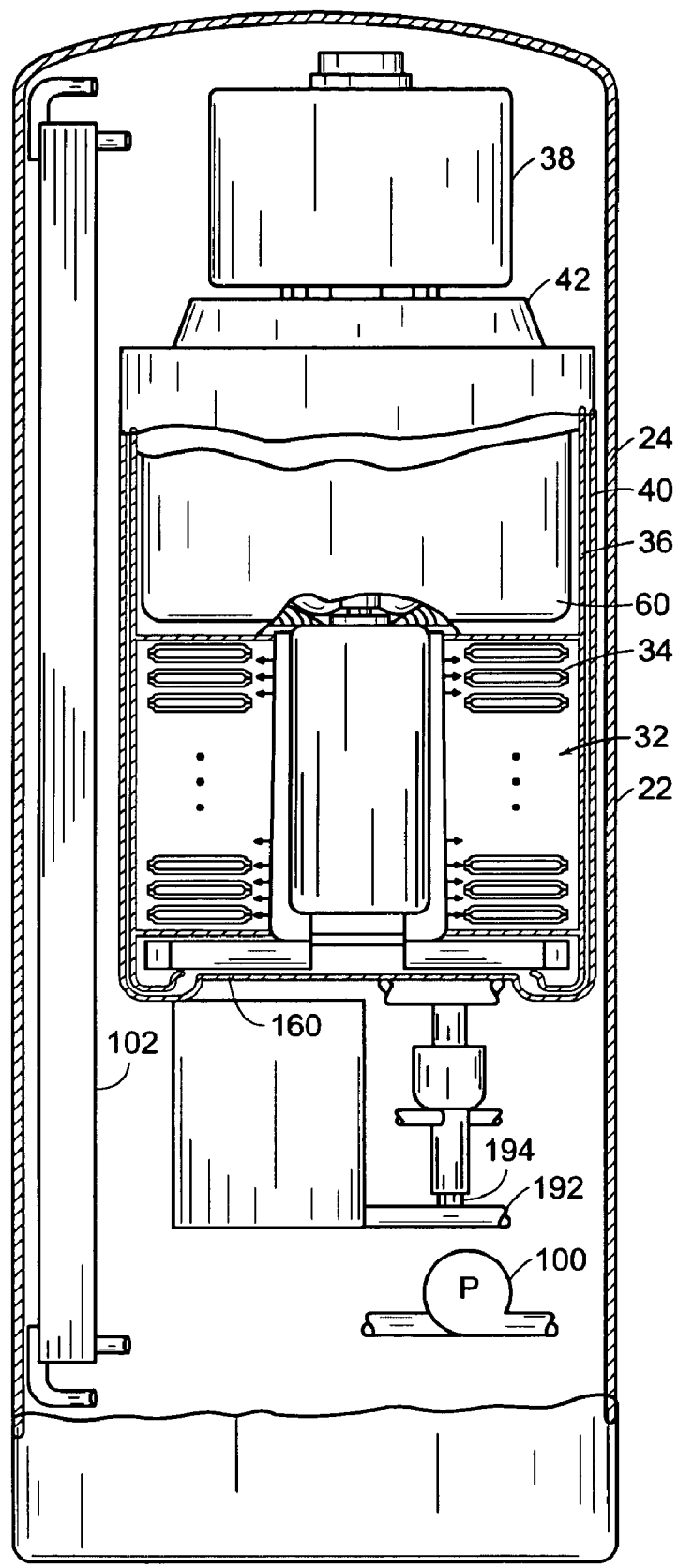
FIG. 2 is a cross-sectional view taken through the distillation unit.

FIG. 2 is a simplified cross-sectional view of the distillation unit. It depicts the housing 22 as having a single-layer wall 24. In single-layer arrangements, the wall is preferably made of low-thermal-conductivity material. Alternatively, it may be a double-layer structure in which the layers are separated by insulating space.

The present invention is an advantageous way to supply feed liquid to the unit's heat exchanger 32. While the present invention's teachings can be employed to feed a wide variety of heat exchangers, the drawings illustrate a particular type of rotary heat exchanger for the sake of concreteness. As will be explained in more detail directly, the illustrated embodiment's rotary heat exchanger is essentially a group of stacked plates, one plate 34 of which will be described in more detail in connection with subsequent drawings. That heat exchanger 32 is part of an assembly that rotates during operation and includes a generally cylindrical shell 36 driven by a motor 38. The rotating assembly's shell 36 is disposed inside a stationary vapor-chamber housing 40 on which is mounted a gear housing 42 that additionally supports the motor 38. The vapor-chamber housing 40 in turn rests in a support omitted from the drawing for the sake of simplicity.

Figure 3:
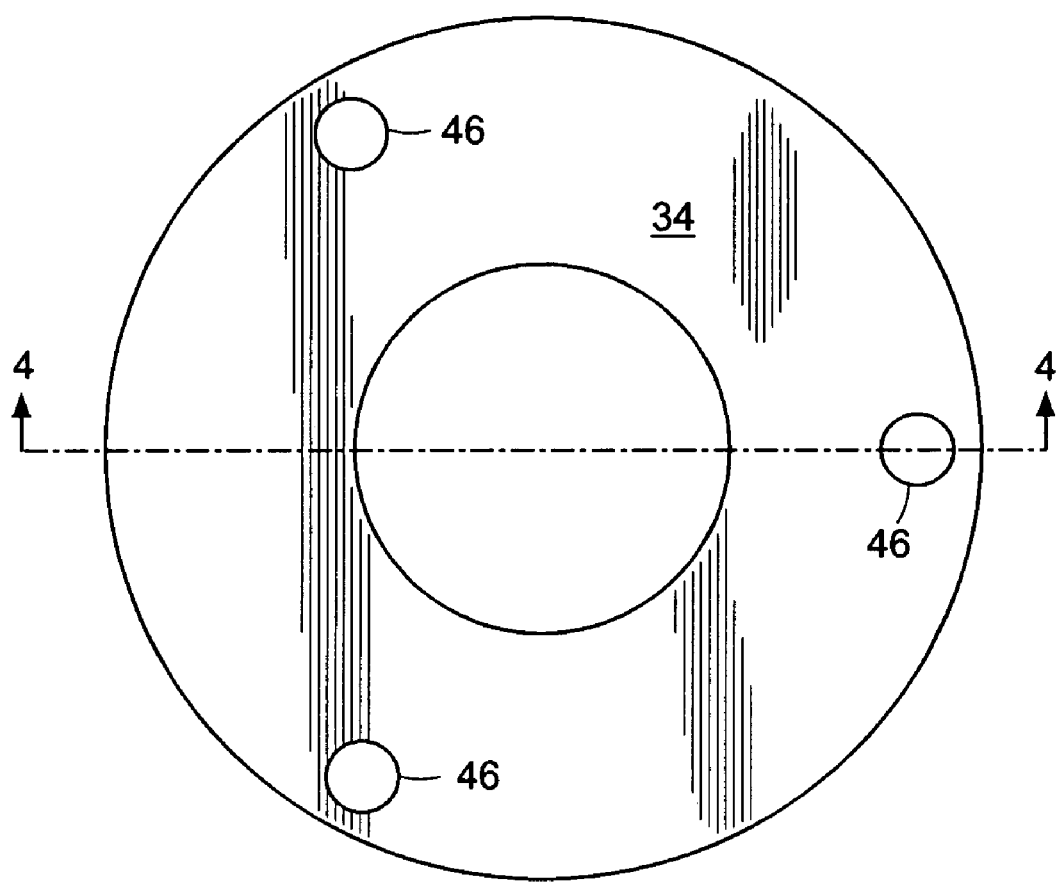
FIG. 3 is a plan view of one of the heat-exchange plates employed in the distillation unit's rotary heat exchanger.
Figure 4:
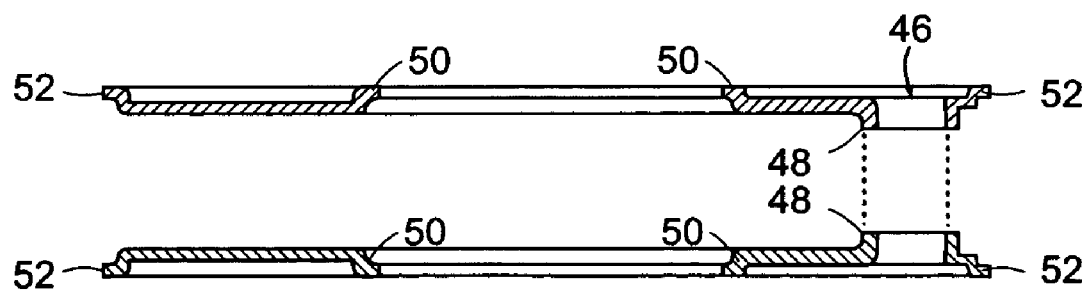
FIG. 4 is a cross-sectional view through two such plates taken at line 4-4 of FIG. 3.

As FIG. 3's exemplary heat-exchanger plate 34 illustrates, each plate is largely annular; it may have an outer diameter of, say, 8.0 inches and an inner diameter of 3.35 inches. Each plate is provided with a number of passage openings 46. FIG. 4, which is a cross section taken at line 4-4 of FIG. 3, shows that the passage openings are formed with annular lips 48 that in alternating plates protrude upward and downward so that, as will be explained in more detail presently, they mate to form passages between the heat exchanger's condensation chambers.

Figure 5:
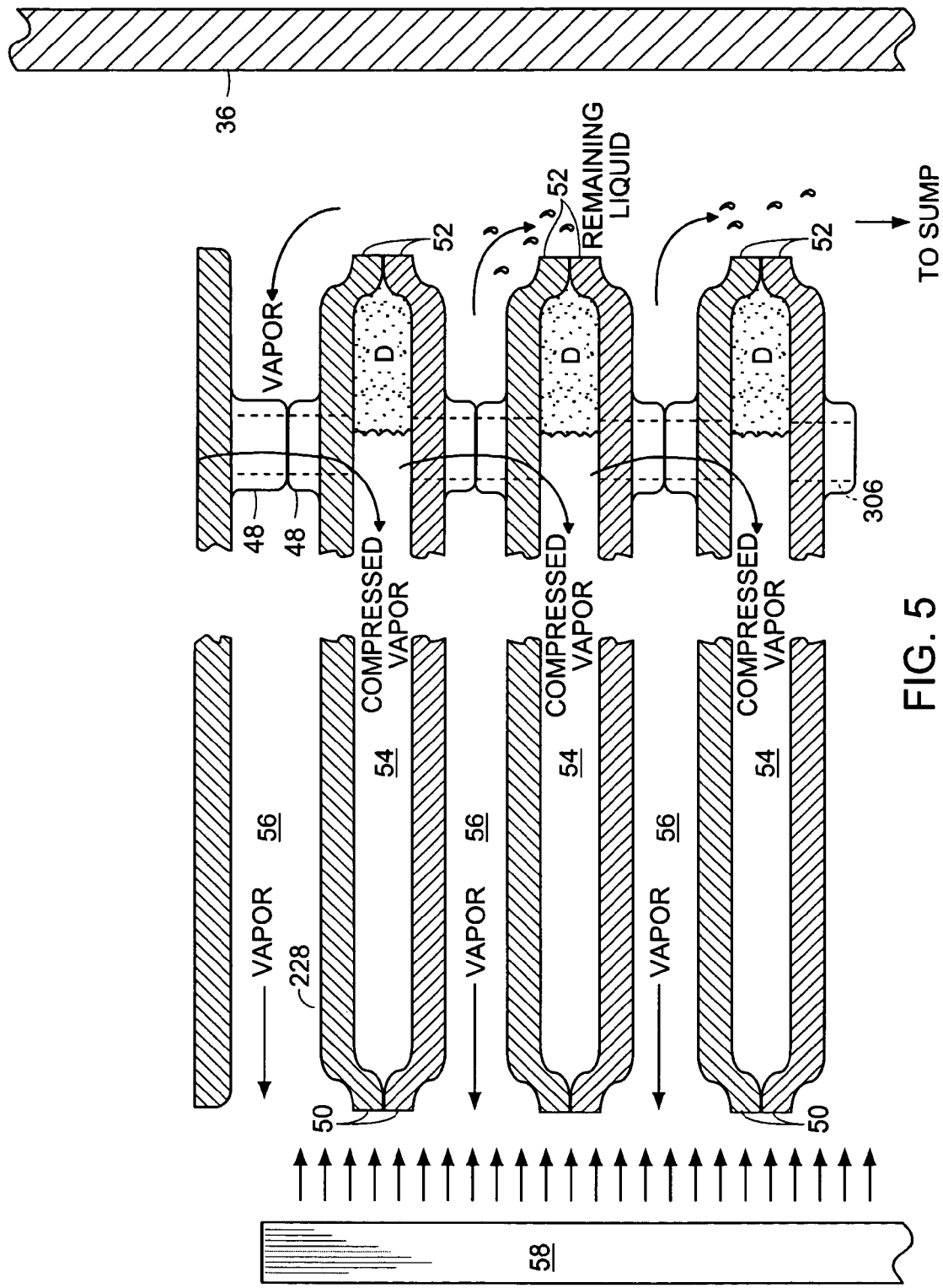
FIG. 5 is a diagram of the fluid flow through the rotary heat exchanger's evaporation and condensation chambers.

To form alternating condensation and evaporation chambers, the heat-exchanger plates are provided with annular flanges 50 at their radially inward edges and annular flanges 52 at their radially outward edges. Like the passage lips 48, these flanges 50 and 52 protrude from their respective plates, but in directions opposite those in which the passage lips 48 protrude. FIG. 5, which depicts the radially inward part of the heat exchanger on the left and the radial outward part on the right, shows that successive plates thereby form enclosed condensation chambers 54 interspersed with open evaporation chambers 56. A recently tested prototype of the heat exchanger employs 108 such plate pairs.

As will be explained in more detail below, a sprayer in the form of a stationary spray arm 58 located centrally of the spinning heat-exchanger plates sprays water to be purified onto the plate surfaces that define the evaporation chambers 56. (The use of the term spray is not intended to imply that the water is necessarily or preferably applied in droplets, although some embodiments may so apply the liquid.) That liquid absorbs heat from those surfaces, and some of it evaporates. FIG. 2's compressor 60 draws the resultant vapor inward.

Figure 6:
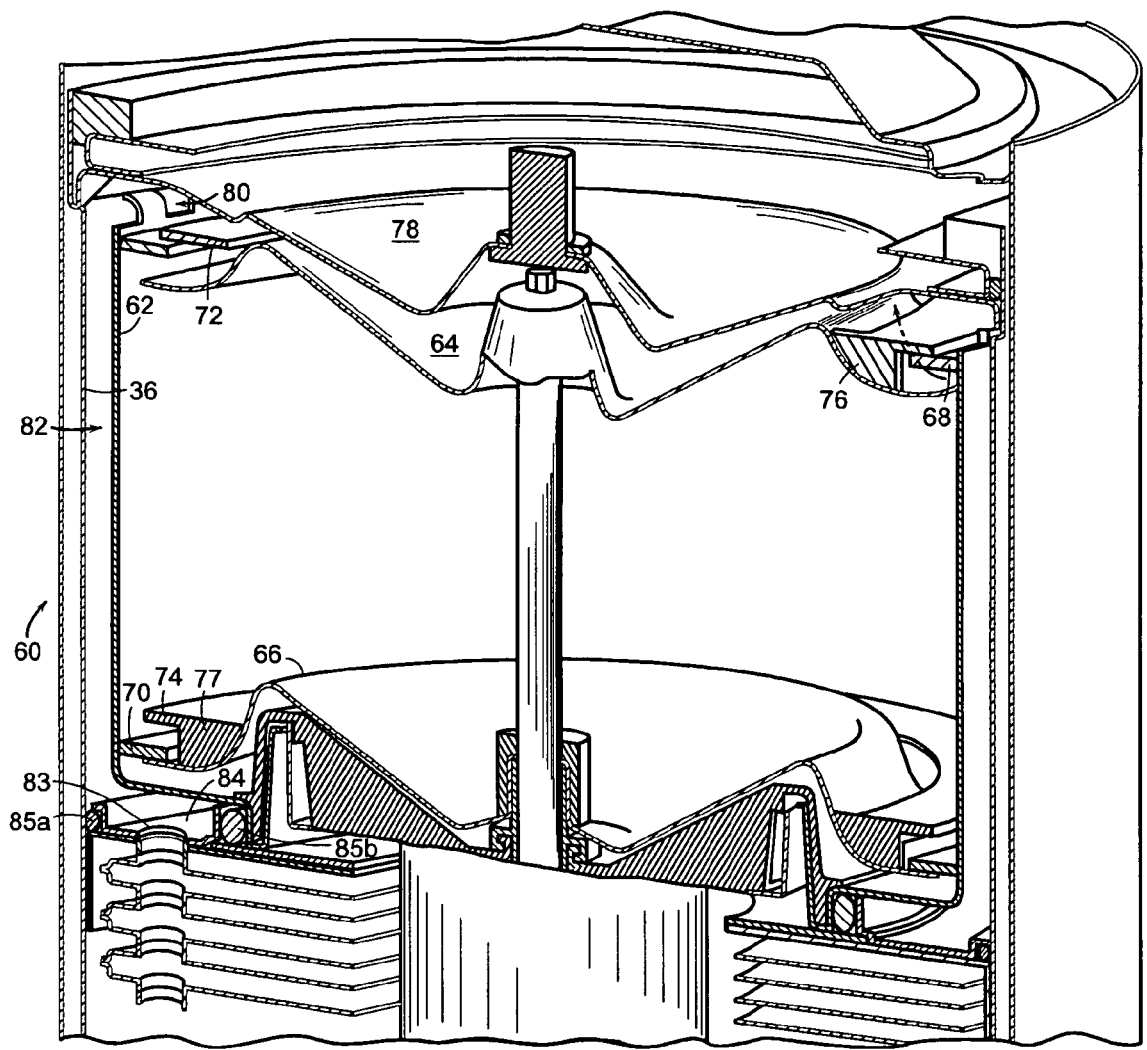
FIG. 6 is a broken-away perspective view of the distillation unit's compressor.

FIG. 6 depicts compressor 60 in more detail. The compressor spins with the rotary heat exchanger and includes a (spinning) compressor cylinder 62 within which a mechanism not shown causes two pistons 64 and 66 to reciprocate out of phase with each other. As a piston rises, its respective piston ring 68 or 70 forms a seal between the piston and the compressor cylinder 62's inner surface so that the piston draws vapor from the heat exchanger's central region. As a piston travels downward, on the other hand, its respective piston ring tends to lift off the piston surface and thereby break the seal between the cylinder wall and the pistons.

When their respective pistons are traveling downward, annular piston-ring stops 72 and 74, which respective struts 76 and 77 secure to respective pistons 64 and 66, drag respective piston rings 68 and 70 downward after the seal has been broken. The piston rings and stops thus leave clearances for vapor flow past the pistons as they move downward, so a downward-moving piston does not urge the vapor back downward as effectively as an upward-moving piston draws it upward. Additionally, the pistons reciprocate so out of phase with each other that there is always one piston moving upward, and thereby effectively drawing the vapor upward, while the other is returning downward.

As will be explained in more detail below, the vapor thus driven upward by the pistons 64 and 66 cannot pass upward beyond the compressor's cylinder head 78, but slots 80 formed in the compressor wall's upper lip provide paths by which the vapor thus drawn from the heat exchanger's central region can be driven down through an annular passage 82 formed between the compressor cylinder 62's outer surface and the rotating-assembly shell 36. This passage leads to openings 83 in an annular cover plate 84 sealed by O-rings 85a and 85b between the compressor cylinder 62 and the rotating-assembly shell 36. The openings 83 register with the openings 46 (FIG. 3) that form the passages between the condensation chambers.

In short, the compressor cylinder 62, the cylinder head 78, and the rotating-assembly shell 36 cooperate to form a guide that directs vapor along a vapor path from FIG. 5's evaporation chambers 56 to its condensation chambers 54. And the compressor compresses the vapor that follows this path, so the vapor pressure in the condensation chambers 54 is higher than that in the evaporation chambers 56, from which the compressor draws the vapor. The boiling point in the condensation chambers therefore is also higher than in the evaporation chambers. So the heat of vaporization freed in the condensation chambers diffuses to the (lower-temperature) evaporation chambers 56.

Figure 7:
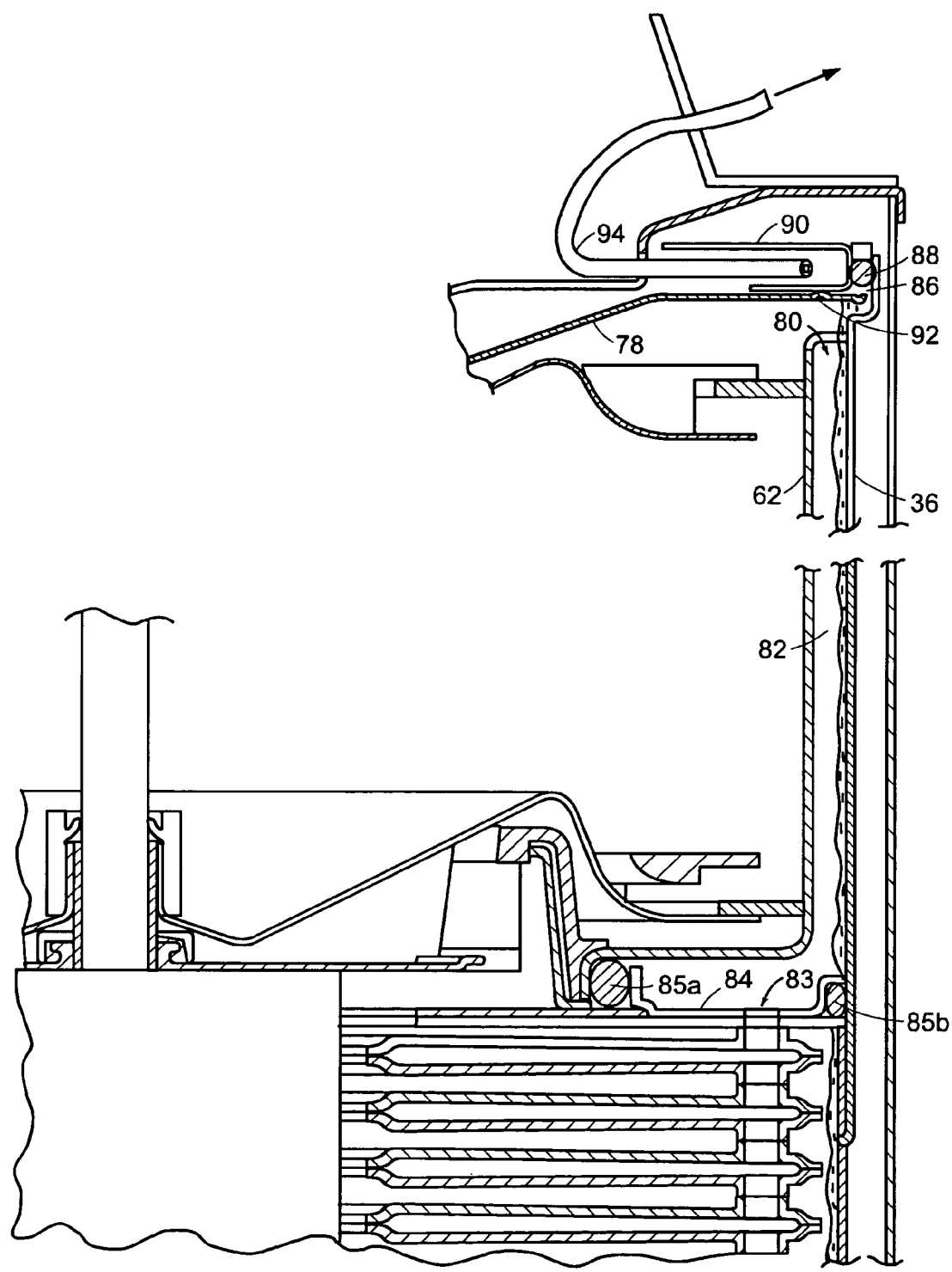
FIG. 7 is a broken-away cross-sectional view of one side of the compressor and the rotary heat exchanger's upper portion showing the fluid-flow paths between them.

In the illustrated embodiment, the rotating assembly rotates at a relatively high rate of, say, 700 to 1000 rpm. The resultant centrifugal force causes the now-purified condensate to collect in the outer ends of the condensation chambers, between which it can flow through the passages that the heat-exchanger-plate openings 46 form. As FIG. 7 shows, the condensate therefore flows out through the openings 83 in the top of the heat exchanger and travels along the channel 82 by which the compressed vapor flowed into the heat exchanger.

Like the compressed vapor, the condensate can flow through the openings 80 in the compressor wall's lip. But the condensate can also flow past the cylinder head 78 because of a clearance 86 between that cylinder head 78 and the rotating-assembly shell, whereas the condensate's presence in that clearance prevents the compressed vapor from similarly flowing past the cylinder head. An O-ring 88 seals between the rotating-assembly shell 36 and a rotating annular channel-forming member 90 secured to the cylinder head 78, but spaced-apart bosses 92 formed in the cylinder head 78 provide clearance between the cylinder head and the channel member so that the condensate, urged by the pressure difference that the compressor imposes, can flow inward and into channel member 90's interior.

Like the cylinder head 78 to which it is secured, the channel-forming member 90 spins with the rotary heat exchanger to cause the purified condensate that it contains to collect under the influence of centrifugal force in the channel's radially outward extremity. The spinning condensate's kinetic energy drives it into a stationary scoop tube 94, from which it flows to FIG. 1's condensate outlet 14 by way of a route that will be described in due course.

While the scoop tube 94 is thus removing the liquid condensate that has formed in the condensation chambers, centrifugal force drives the unevaporated feed liquid from the evaporation chambers to form an annular layer on the part of the rotating-assembly wall 36 below plate 84: that wall thus forms a liquid-collecting sump. Another scoop tube, which will be described below, removes this unevaporated liquid for recirculation through the rotary heat exchanger.

Figure 8:
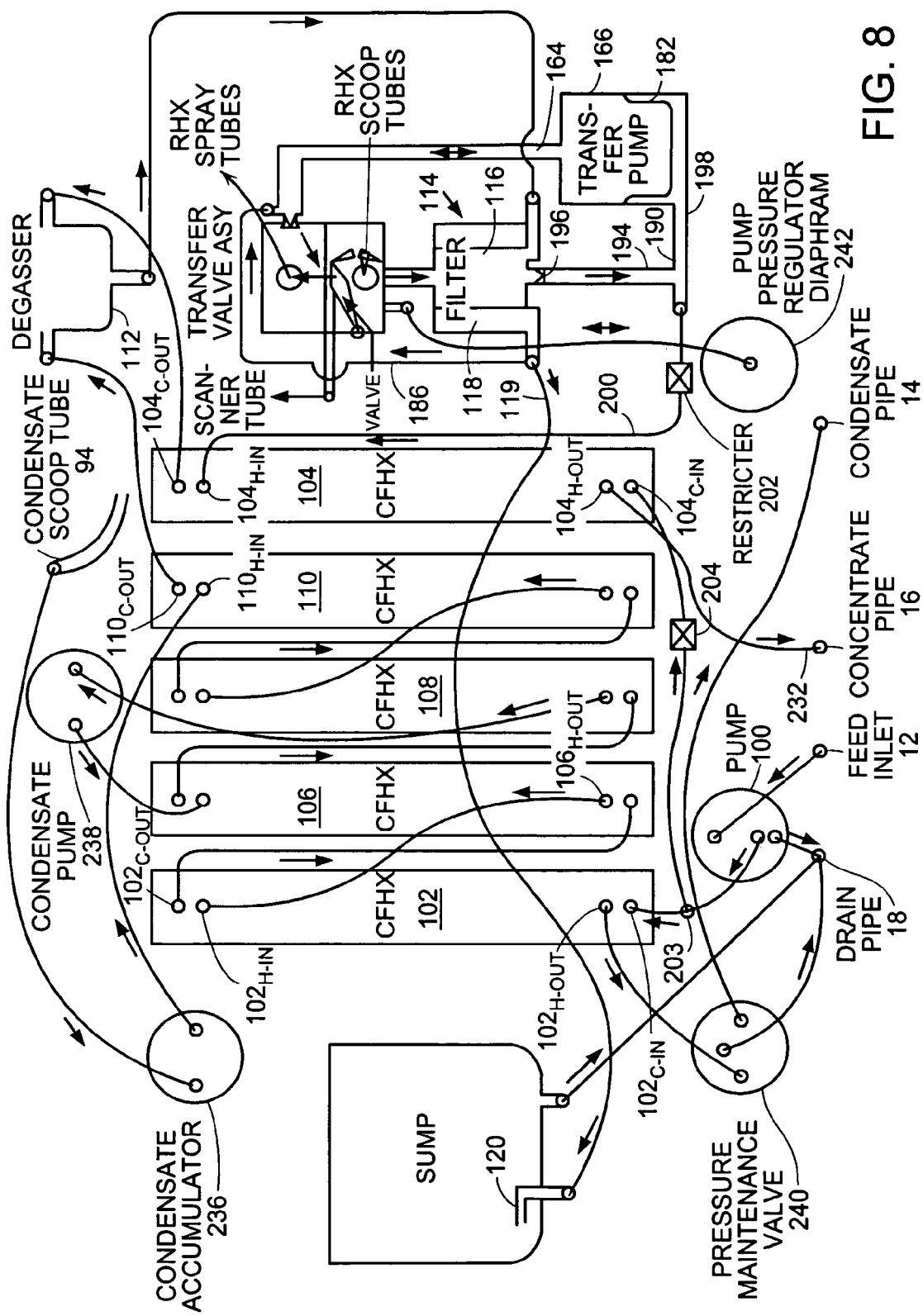
FIG. 8 is schematic diagram of the distillation unit's fluid circuit.

Before we deal with the manner in which the recirculation occurs, we summarize the overall fluid circuit by reference to FIG. 8. A pump 100 draws feed liquid from the feed inlet 12 and drives it to the cold-water inlets $102_{C\_IN}$ and $104_{C\_IN}$ of respective counterflow-heat-exchanger modules 102 and 104. Those modules guide the feedwater along respective feed-water paths to respective cold-water outlets $102_{C\_OUT}$ and $104_{C\_OUT}$. In flowing along those paths, the feedwater is in thermal communication with counterflows that enter those heat exchangers at hot-water inlets $102_{H\_IN}$ and $104_{H\_IN}$ and leave through hot-water outlets $102_{H\_OUT}$ and $104_{H\_OUT}$, as will be explained in more detail below, so it is heated. (The terms hot and cold here respectively refer to the fluid flows from which and to which heat is intended to flow in the counterflow heat exchangers. They are not intended to refer to absolute temperatures; the liquid leaving a given counterflow heat exchanger's "cold"-water outlet, for instance, will ordinarily be hotter than the liquid leaving its "hot"-water outlet.)

For reasons that will be set forth below, counterflow-heat-exchanger module 104 receives a minor fraction of the feed-water flow driven by the pump 100. Its volume flow rate is therefore relatively low, and the temperature increase of which it is capable in a single pass is relatively high as a consequence. For modularity purposes, counterflow-heat-exchanger module 102 in the illustrated embodiment is essentially identical to counterflow-heat-exchanger module 104, but it receives a much higher volume flow rate, and the temperature increase that it can impart is correspondingly low. So the cold-water flow through counterflow-heat-exchanger module 102 also flows serially through further modules 106, 108, and 110 to achieve a temperature increase approximately equal to module 104's.

The series-connected modules' output from outlet $110_{C\_OUT}$ is fed to a degasser 112, as is the single heat exchanger 104's output from outlet $104_{C\_OUT}$. For the sake of simplicity, FIG. 2 omits the degasser, but the degasser would typically enclose the motor 38 to absorb heat from it. The degasser thus further heats the liquid. Together with the heat imparted by the counterflow heat exchangers, this heat may be enough to raise the feed-liquid temperature to the level required for optimum evaporator/condenser action when steady-state operation is reached. From a cold start, though, a supplemental heat source such as a heating coil (not shown) would in most cases contribute to the needed heat. The residence time in the degasser is long enough to remove most dissolved gasses and volatiles from the stream. The thus-degassed liquid then flows to a filter assembly 114, where its flow through a filter body 116 results in particulate removal.

Figure 9:
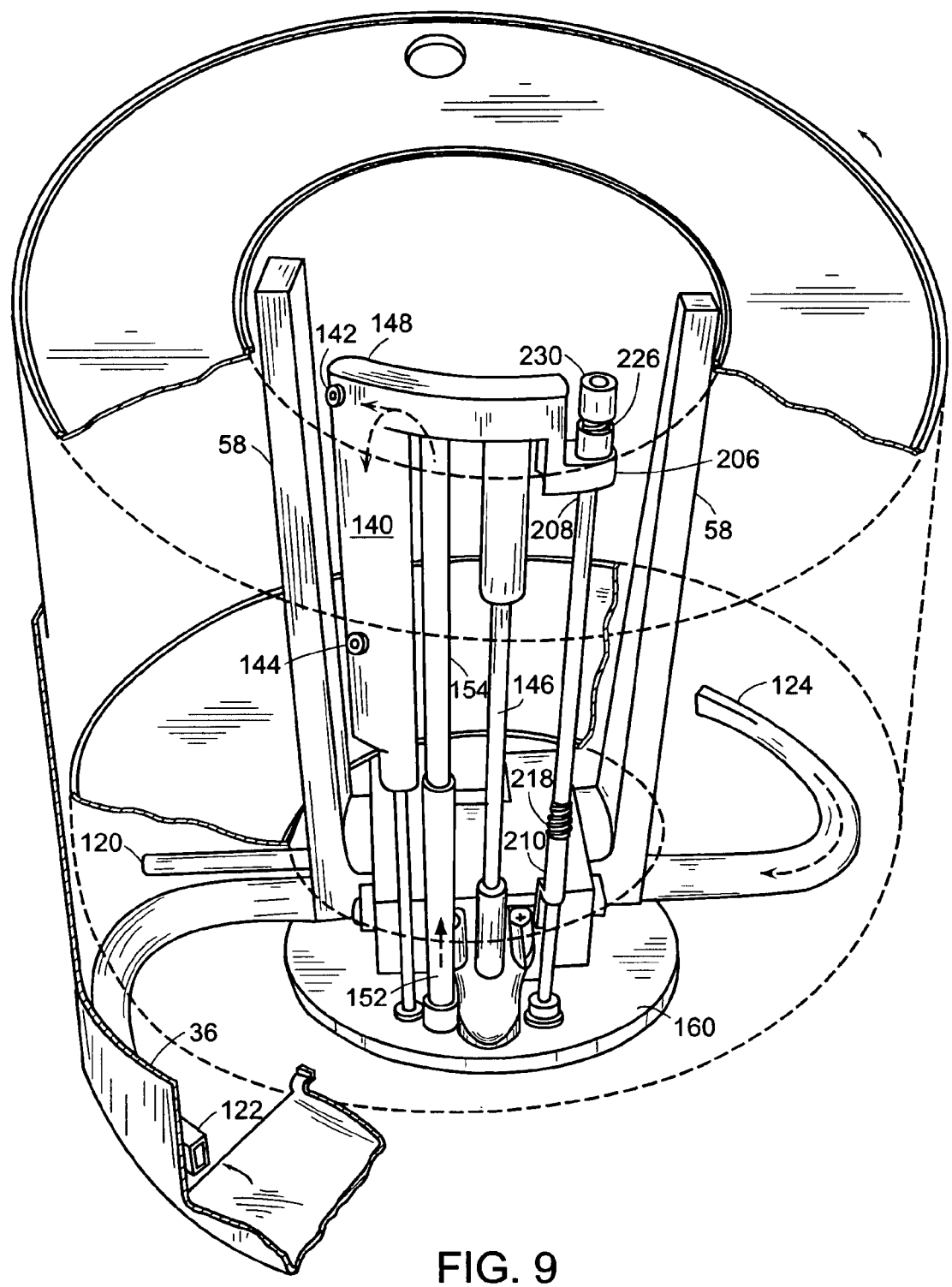
FIG. 9 is a perspective view of the vapor-chamber base, main scoop tubes, and irrigation arms that the distillation unit employs.

The resultant filtered liquid flows from the filter body 116 to an annular exit chamber 118, from which it issues in streams directed to two destinations. Most of that liquid flows by way of tube 119 to a nozzle 120. As FIG. 9 shows, nozzle 120 delivers the filtered feed liquid to the rotating-assembly shell 36's inner surface, where it joins the liquid layer formed by the liquid that has flowed through the evaporation chambers without evaporating. Only a minor fraction of the liquid that flows into the evaporation chambers evaporates in those chambers in one pass, so most of it contributes to the rotating layer, whereas the feed nozzle 120 delivers only enough liquid to that layer to replenish the fluid that has escaped by evaporation.

Figure 13:
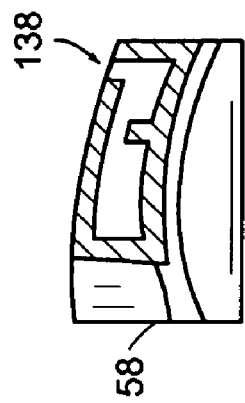
FIG. 13 is a cross-sectional view of one of the spray arms, taken at line 13-13 of FIG. 12.
Figure 10:
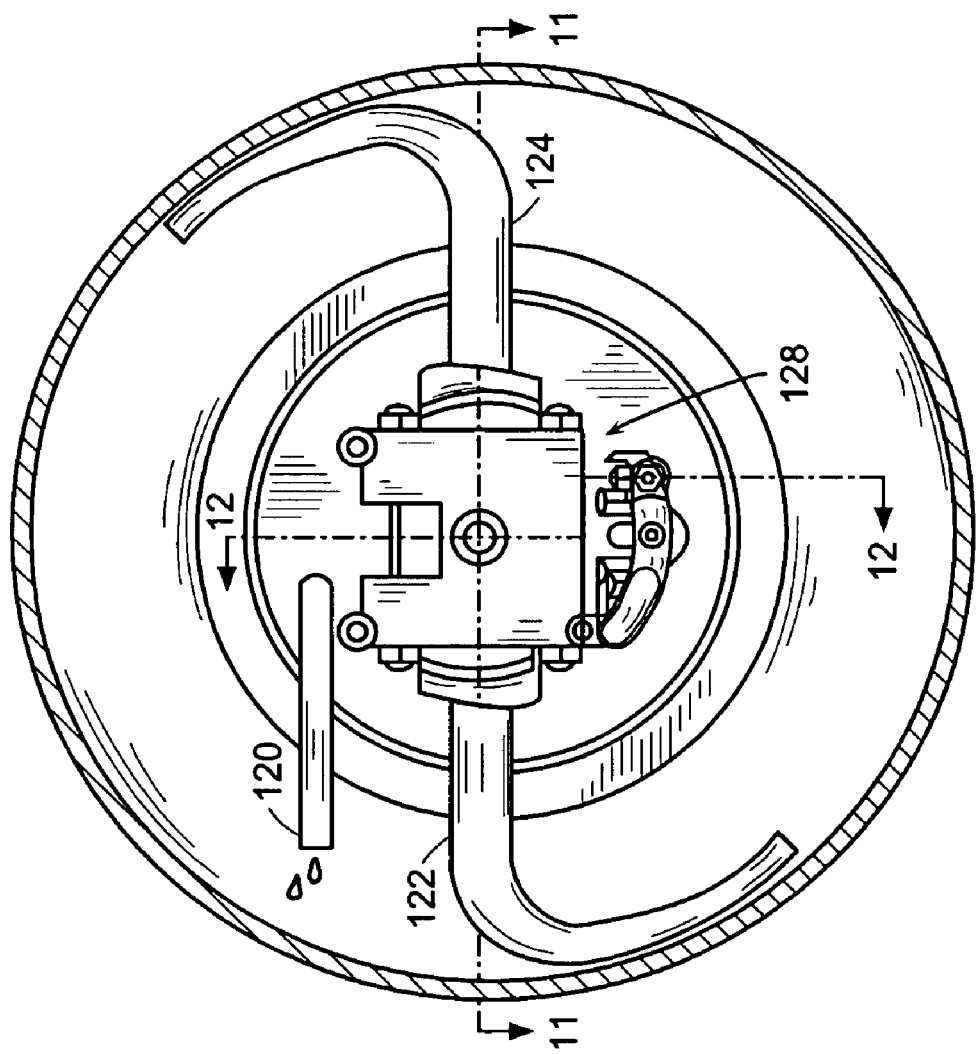
FIG. 10 is a plan view of the elements that FIG. 9 depicts.
Figure 11:
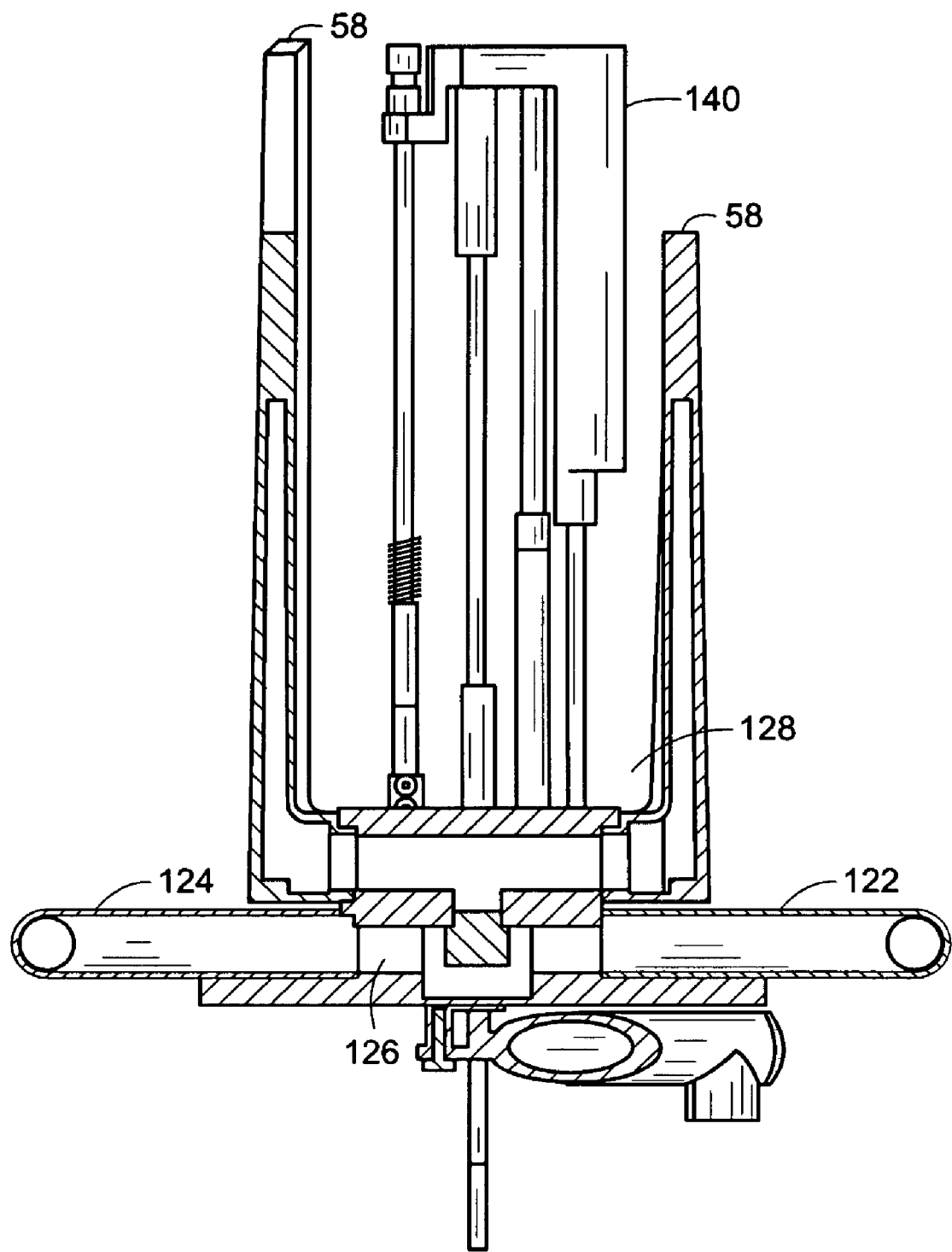
FIG. 11 is a cross-sectional view taken at line 11-11 of FIG. 10.
Figure 12:
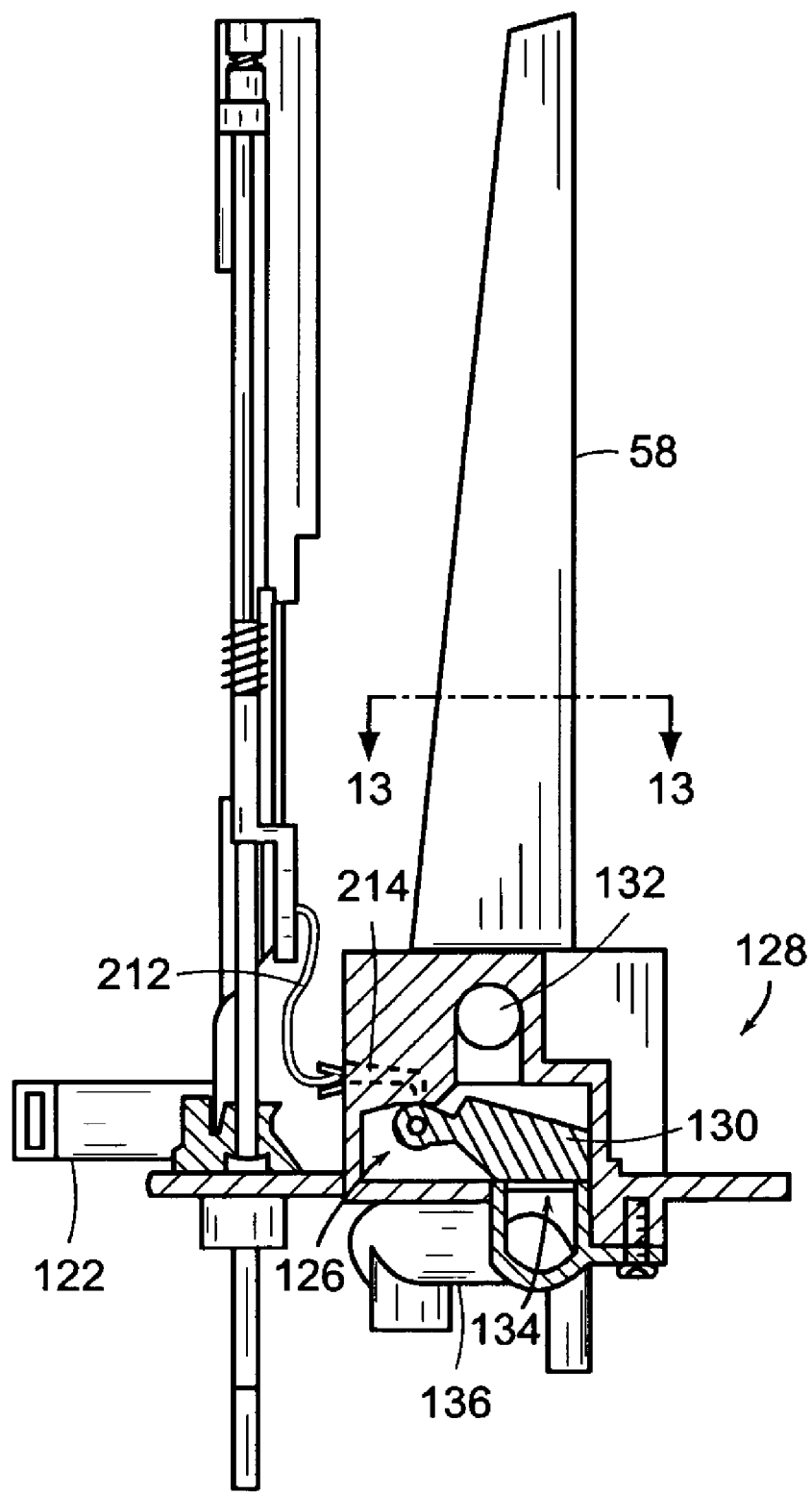
FIG. 12 is a cross-sectional view taken at line 12-12 of FIG. 10.

Stationary scoop tubes 122 and 124 scoop liquid from this rotating layer. The scooped liquid's kinetic energy drives it along those tubes, which FIG. 10 shows in plan view and FIGS. 11 and 12 show in cross-sectional views respectively taken at lines 11-11 and 12-12 of FIG. 10. To minimize the kinetic energy's dissipation, each scoop tube bends gradually to a predominantly radial direction. Also, each scoop tube is relatively narrow at its entrance but widens gradually to convert some of the liquid's dynamic head into static head. Those tubes guide the thus scooped liquid into an interior chamber 126 (FIG. 11) of a transfer-valve assembly 128. Ordinarily, a transfer-valve member 130 is oriented as FIG. 12 shows. In this orientation it permits flow from the interior chamber 126 through entry ports 132 into spray arms 58 but prevents flow through a port 134 into a conduit 136 that leads to an upper entrance of FIG. 8's filter assembly 114. The static head drives the liquid up the spray arms. FIG. 13, which is cross-sectional view taken at line 13-13 of FIG. 12, shows that each of the spray arms 58 forms a longitudinal slit 138. These slits act as nozzles from which the (largely recirculated) liquid sprays into the evaporation chambers 56 depicted in FIG. 5.

In short, the liquid-collecting inner surface of the rotating-assembly shell 36, the scoop tubes 122 and 124, the transfer-valve assembly 128, and the spray arms 58 form a guide that directs unevaporated liquid along a recirculation path that returns it to the evaporation chambers 56. And, since FIG. 8's nozzle 120 supplements the recirculating liquid with feed liquid, this guide cooperates with the main pump 100, the counterflow heat exchangers 102, 104, 106, 108, and 110, the degasser 112, the filter assembly 114, and the tubes that run between them as well as tube 118 and nozzle 120 to form a further guide. This further guide directs feed liquid along a make-up path from the feed inlet 12 to the evaporation chambers 56.

Now, so long as its evaporator-chamber surfaces stay wetted, heat-transfer efficiency in the rotary heat exchanger is greatest when the water film on these surfaces is thinnest. The flow volume through the spray arms 58 should therefore be so controlled as to leave that film as thin as possible. In the illustrated embodiment, the flow rate through those spray arms is chosen to be just high enough to keep the surfaces from drying completely between periodic wetting sprays from a scanner 140 best seen in FIG. 9. The scanner includes two scanner nozzles 142 and 144 that provide a supplemental spray at two discrete (but changing) heights within the rotary heat exchanger.

Figure 14:
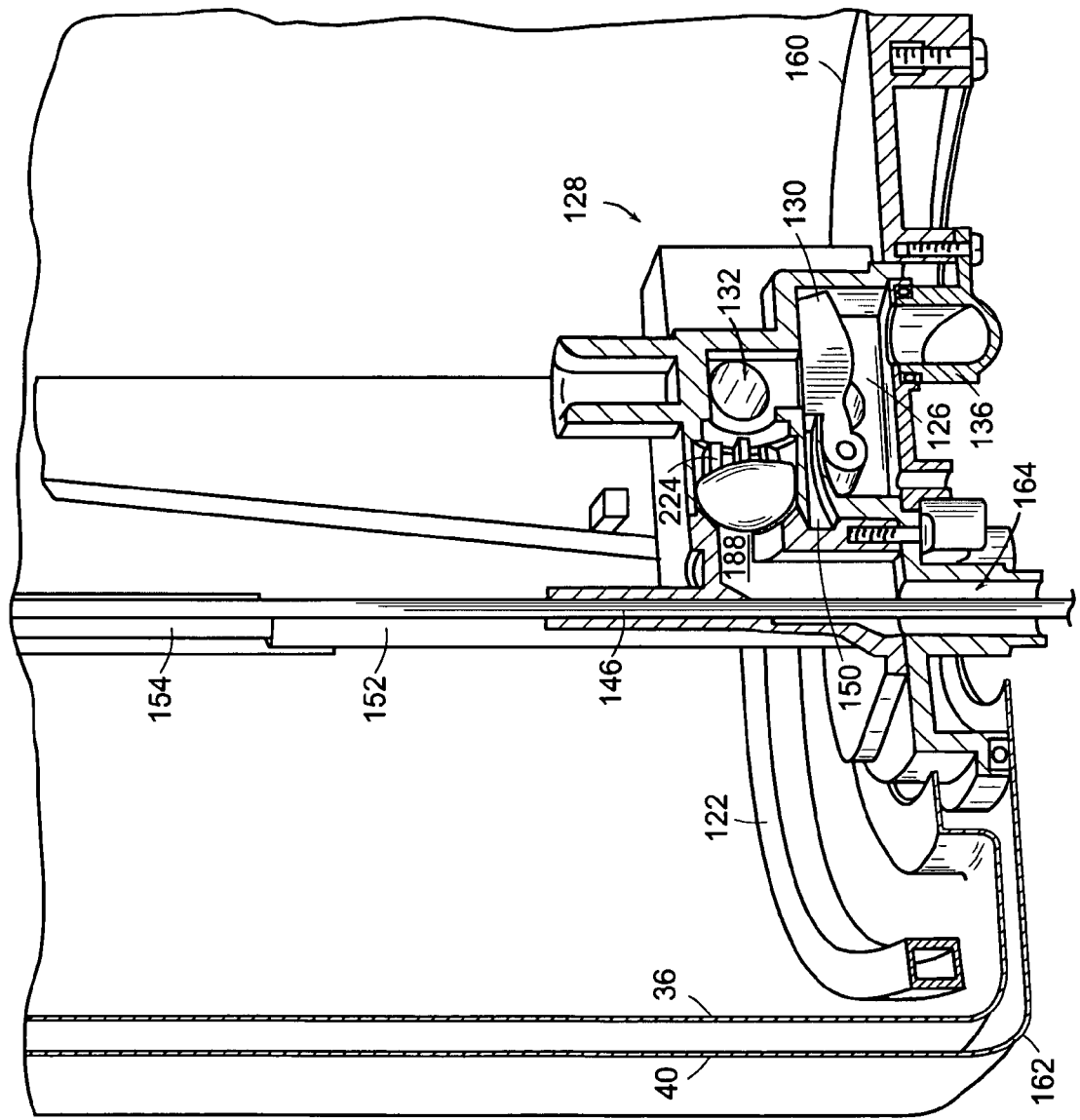
FIG. 14 is a broken-away perspective view of the distillation unit's transfer valve and related elements.

The nozzles' heights change because a drive rod 146 reciprocates, in a manner that will presently be described in more detail, to raise and lower a yoke 148 from which the scanner 140 extends. Control of the scanner feed is best seen in FIG. 14, which is a cross-sectional view, with parts removed, of the vapor-chamber housing 40's lower interior. FIG. 14 depicts the valve member 130 in the closed state, but when the valve member 130 is in its opposite, open state, it permits flow not only into the spray tubes' ports 132 but also into a path through a separate feed conduit 150 by way of an internal passage not shown into a vertically extending tube 152. A telescoping conduit 154 that slides in tube 152 conducts the flow, as best seen in FIG. 9, through the yoke 148 and into the scanner 140. So these elements guide liquid along a further branch of the recirculation and make-up paths.

As the reciprocating rod 146 drives the yoke 148 and thereby the scanner 140 up and down, successive evaporation chambers momentarily receive a supplemental liquid spray. This spray is enough to wet the evaporator surfaces if they have become dry, or at least to prevent them from drying as they would if they were sprayed only through the spray arms 58. The flow rate experienced by each of the evaporation chambers is therefore cyclical. The steady flow from the spray arms can be low enough not to keep the surfaces wetted by itself. Indeed, the cyclical spray can keep the surfaces wetted even if the average flow rate that results when the supplemental scanner spray is taken into account would not be great enough to keep the surface wetted if it were applied steadily.

Under testing conditions that I have employed, for example, the irrigation rate required to keep the plates wetted is about 4.0 gal./hr./plate if the irrigation rate is kept constant. But I have been able to keep the heat-transfer surfaces wetted when the spray arms together sprayed 216 gal./hr. on 216 plates, or only 1.0 gal./hr./plate. True, this spray was supplemented by the spray from the scanner. But the scanner nozzles together contributed only 30 gal./hr. Since the scanner nozzles together overlap two evaporation chambers in my prototype so as to spray an average of four plates at a time, this meant that the scanner sprayed each plate for about 4/216=1.9% of the time at about 30 gal./hr. ÷4 plates=7.5 gal./hr./plate. Although the resultant peak irrigation rate was therefore 8.5 gal./hr./plate, which exceeds the constant rate required to keep the plates wetted, the average irrigation rate was only 1.14 gal./hr./plate, or only 28% of that constant rate of 4.0 gal./hr./plate. Such a low rate contributes to heat-exchanger efficiency, because it permits the average film thickness to be made less without drying than would be possible with only a steady spray. While it is not necessary to use these particular irrigation rates, most embodiments of the present invention will employ average rates no more than half the constant rate required for wetting, while the peak rate will exceed that constant rate.

The manner in which the scanner 140's reciprocation is provided is not critical to the present invention; those skilled in the art will recognize many ways in which to cause reciprocation. But the way in which the illustrated embodiment provides the reciprocation is beneficial because it takes advantage of the mechanisms used to refresh the rotary-heat-exchanger fluid and to back flush the filter. To understand those mechanisms, it helps to refer to FIG. 14.

FIG. 14 shows that the transfer-valve assembly 128 is provided on a vapor-chamber base 160 sealingly secured to the vapor-chamber housing 40's lower annular lip 162. Together that lip and the vapor-chamber base can be thought of as forming a secondary, stationary sump that catches any spillage from the main, rotating sump. The heating coil mentioned above for use on startup may be located in that sump and raise the system to temperature by heating sump liquid whose resultant vapor carries the heat to the remainder of the system.

Figure 15:
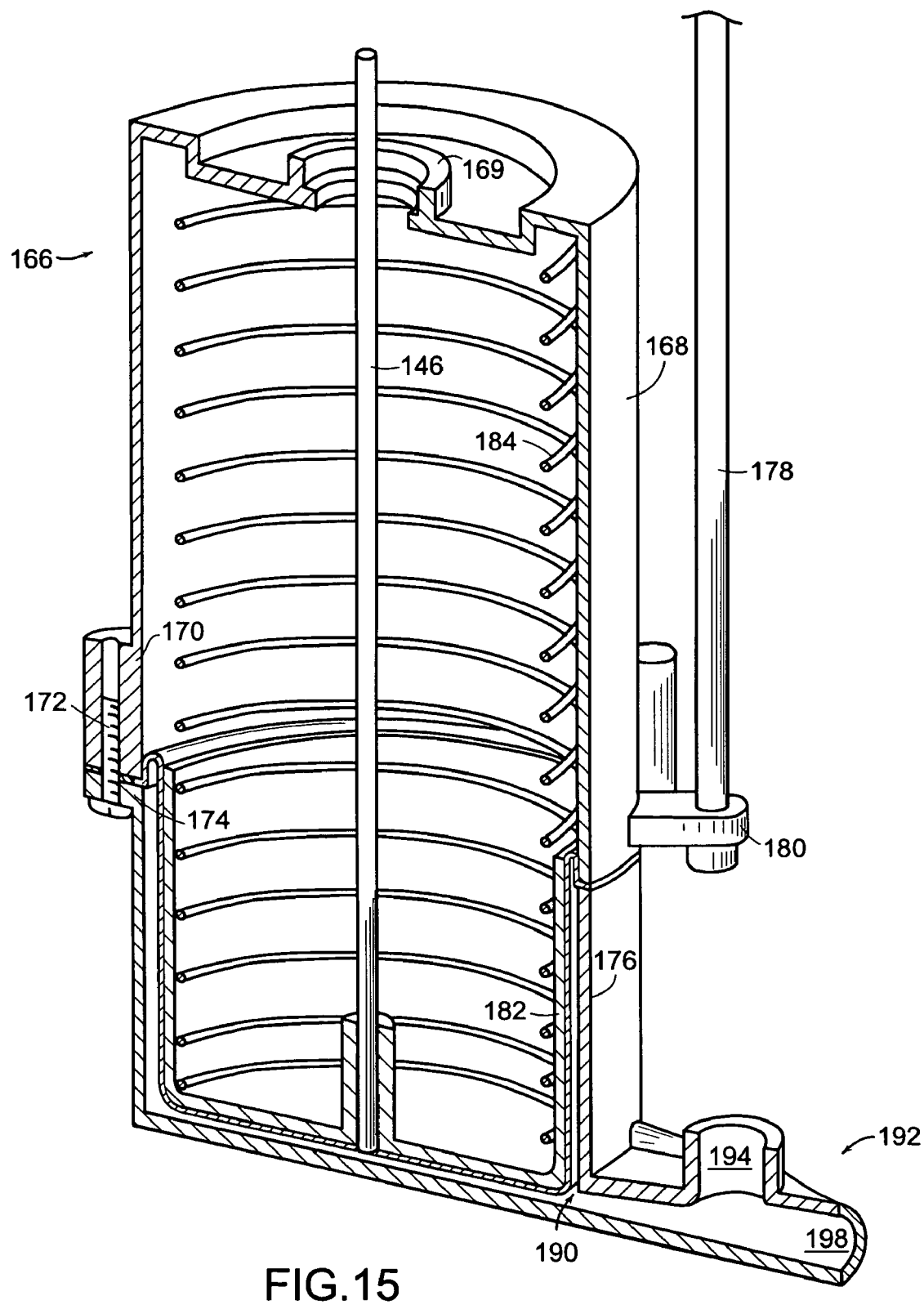
FIG. 15 is a broken-away perspective view of the distillation unit's transfer pump.

Among the several features that the vapor-chamber base 160 forms is a vertical transfer-pump port 164, through which the drive rod 146 extends. That rod extends into a transfer pump 166 that FIG. 14 omits but FIG. 15 illustrates in cross section. The transfer pump 166 includes an upper cylinder half 168 that forms a cylindrical lip 169, which mates with the transfer-pump port 164 of FIG. 14. It also forms a flange 170 by which a bolt 172 secures it to a corresponding flange 174 formed on a lower cylinder half 176. FIG. 15 also depicts a mounting post 178, which is one of two that are secured to FIG. 14's vapor-chamber base 160 and support the transfer pump 116 by means of flanges, such as flange 180, formed on the upper cylinder half 168.

A piston 182 is movably disposed inside the transfer-pump cylinder that halves 168 and 176 form, and a spring 184 biases the piston 182 into the position that FIG. 15 depicts. As that drawing illustrates, the drive rod 146 is so secured to the piston 182 as to be driven by it as the piston reciprocates in response to spring 184 and fluid flows that will now be described by reference to FIG. 8.

It will be recalled that the filter assembly 114's output is divided between two flows. In addition to the liquid-make-up flow through tube 119 to the feed nozzle 120, there is a second, smaller flow through another tube 186. This tube leads to a channel, not shown in FIG. 14, that communicates with an upper section 188, which FIG. 14 does show, of the transfer-pump port 164. During most of its operating cycle, the piston 182 shown in FIG. 15 moves slowly downward in response to the force of its bias spring 184 and thereby draws liquid from FIG. 8's tube 186 through port 164 into the portion of the transfer pump's interior above the piston 182. As will be seen, this portion serves as a refresh-liquid reservoir, and the components that guide feed liquid from FIG. 8's feed inlet 12 through the filter assembly 114 cooperate with tube 186 and port 164 to form a guide that directs feed liquid along a feed-liquid-storage path into that reservoir.

Figure 16:
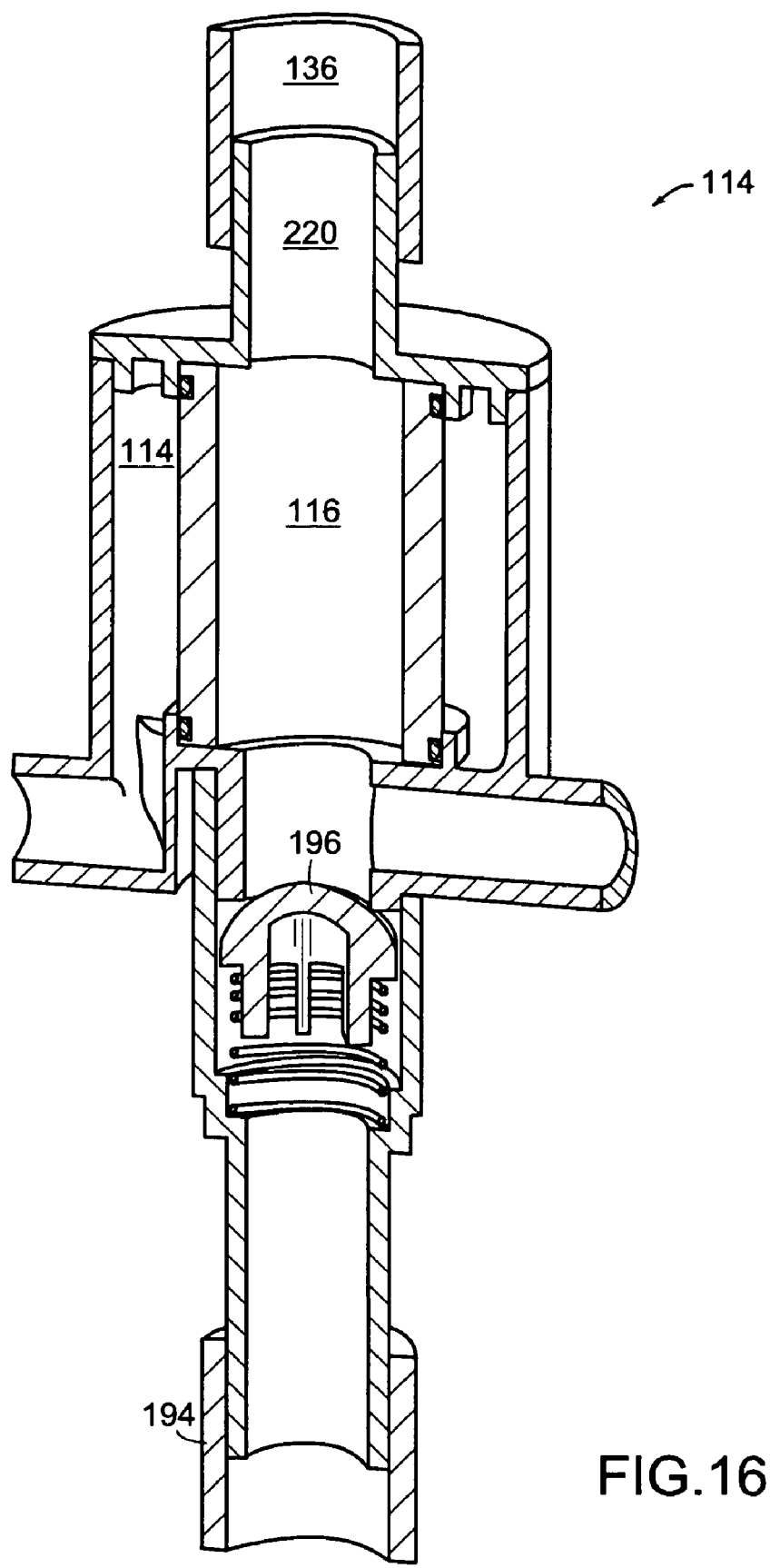
FIG. 16 is a broken-away isometric view of the distillation unit's filter assembly.

As will also be seen, the pump's lower portion serves as a concentrate reservoir. While the piston is drawing liquid into the refresh-liquid reservoir, it is expelling liquid from the concentrate reservoir through an output port 190 formed, as FIG. 15 shows, by the lower cylinder half 176. The lower cylinder half further forms a manifold 192. One outlet 194 of that manifold leads to the filter assembly 114, which FIG. 15 omits but FIG. 16 depicts in cross section. FIG. 16 shows that the filter assembly includes a check valve 196 that prevents flow into the filter assembly from manifold outlet 194. As FIG. 15 shows, the flow leaving the transfer pump from its lower outlet 190 must therefore flow through the other manifold outlet 198.

FIG. 8 shows that a tube 200 receives that transfer-pump output. A flow restricter 202 in that tube limits its flow and thus the rate at which the transfer-pump piston can descend. By thus limiting the transfer-pump piston 182's rate of descent, flow restricter 202 also limits how much of the filter assembly 114's output flows through tube 186 into the transfer pump 166's upper side, with the result that the transfer pump receives only a small fraction of the filter output and thus of the output from the input pump 100. A flow divider comprising a flow junction 203 and another flow restricter 204 so controls the proportion of pump 100's output that feeds counterflow-heat-exchanger module 104's cold side that this cold-side flow approximates the hot-side flow that flow restricter 202 permits: main pump 100's output is divided in the same proportion as the transfer pump 166's output is. As was mentioned above, the resultant relatively low flow rate into module 104 is what enables the entire heat transfer to occur in a single module 104, whereas the higher flow rate through modules 102, 106, 108, and 110 necessitates, their series combination.

Because of the flow restricter 202, FIG. 15's transfer-pump piston 182 moves downward under spring force at a relatively leisurely rate, taking, say, five minutes to proceed from the top to the bottom of the transfer-pump cylinder. As the piston descends, it draws the drive rod 146 downward with it, thereby causing FIG. 9's scanner nozzles 142 and 144 to scan respective halves of the rotary heat exchanger's set of evaporation chambers. At the same time, it slides an actuator sleeve 206 provided by yoke 148 along an actuator rod 208.

Figure 17:
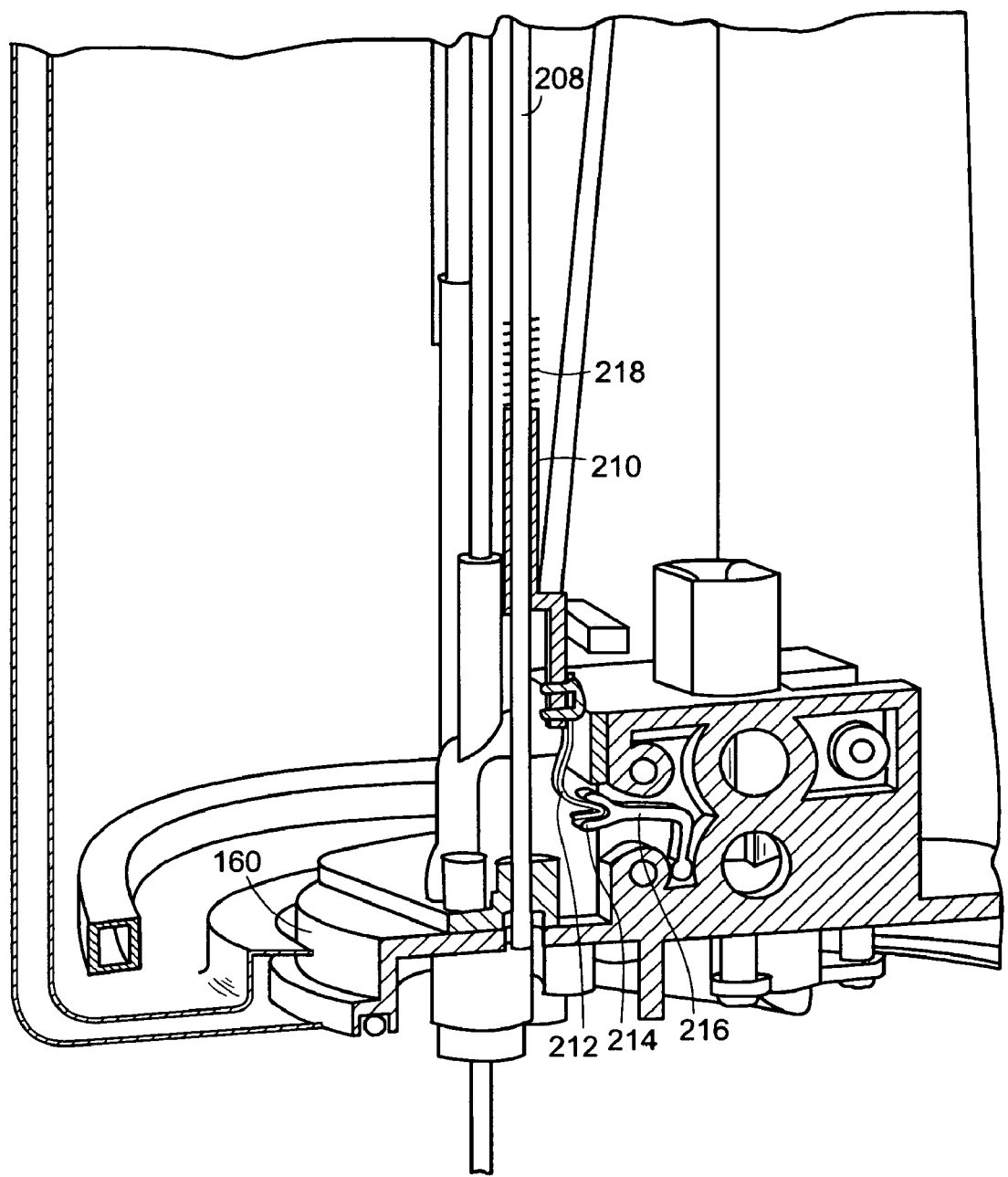
FIG. 17 is a further broken-away perspective view of the transfer valve illustrating the valve crank and its actuator in particular.

As FIG. 17 shows, a spring mount 210 is rigidly secured to the actuator rod 208 and so mounts a valve-actuating spring 212 that the spring's tip fits in the crotch 214 of a valve crank 216. The spring engages the crank in an over-center configuration that ordinarily keeps that actuator rod 208 in the illustrated relatively elevated position. The valve crank 216 is pivotably mounted in the transfer-valve assembly and secured to FIG. 12's transfer-valve member 130 to control its state.

Figure 18:
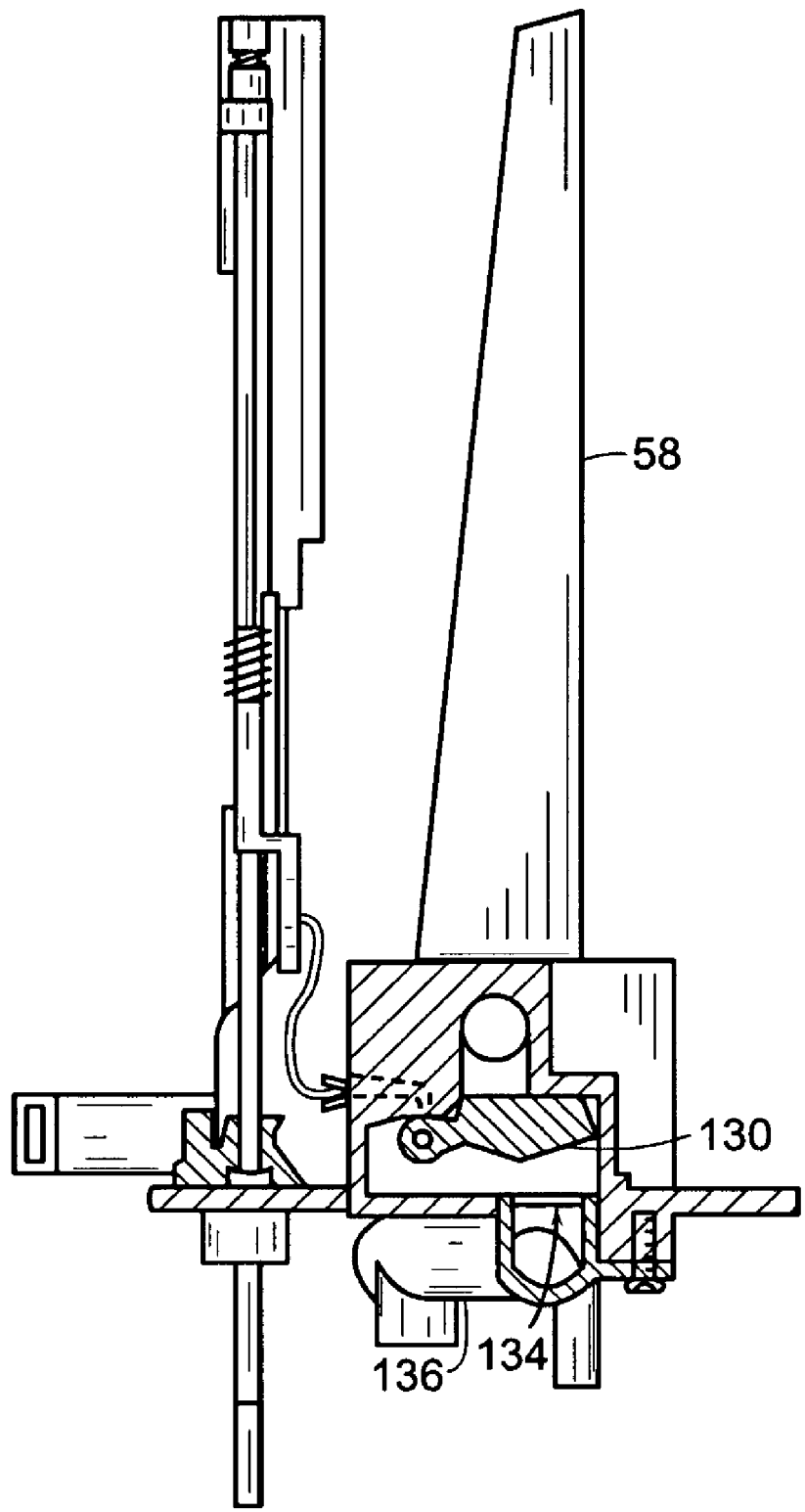
FIG. 18 is a view similar to FIG. 12, but showing the transfer valve in its elevated position.

When the valve crank 216 is in its normal, upper position depicted in FIG. 17, the transfer-valve member 130 is in the lower position, depicted in FIG. 12, in which it directs liquid from the scoop tubes 122 and 124 (FIG. 10) to flow into the spray arms 58 and scanner 140 but not into the filter inlet port 134. As FIG. 9's yoke 148 continues its descent, though, its actuator sleeve 206 eventually begins to bear against a buffer spring 218 that rests on the spring mount 210's upper end. The resultant force on the mount and thus on the actuator rod 208 overcomes the restraining force of FIG. 17's valve-actuating spring 212, causing the valve crank 216 to snap to its lower position. It thereby operates FIG. 12's valve member 130 from its position illustrated in FIG. 12 to its FIG. 18 position, in which it redirects the scoop-tube flow from the spray arms 58 to the conduit 136 that feeds the filter assembly's upper inlet 220 (FIG. 16).

Now, whereas fluid ordinarily flows through the filter at only the relatively low rate required to compensate for evaporation, the flow directed by this transfer-valve actuation into the filter is the entire recirculation flow; that is, it includes all of the liquid that has flowed through FIG. 5's evaporation chambers 56 without evaporating. Since only a relatively small proportion of the liquid that is fed to the evaporation chambers actually evaporates in any given pass, the recirculation flow is many times the feed flow, typically twenty times.

The pressure that this high flow causes within the filter assembly opens the filter assembly's check valve 196 (FIG. 16) and thereby permits the recirculation flow to back through the outlet 194 of FIG. 15's transfer-pump-output manifold 192 and, because of the resistance offered by flow restricter 202 (FIG. 8), back through the transfer pump's outlet 190 to the concentrate reservoir. With the transfer valve in this state, that is, the scoop tubes 122 and 124 (FIG. 10), the transfer-valve assembly 128, and the filter assembly 114 (FIG. 16) form a guide that directs concentrate from the liquid-collecting inner surface of the rotating-assembly shell 36 (FIG. 9) along a concentrate-storage path to the transfer pump's concentrate reservoir.

That redirected flow flushes the filter so as to reduce its impurities load and thus the maintenance frequency it would otherwise require. It also drives the transfer-pump piston 182 (FIG. 15) rapidly upward. The piston in turn rapidly drives the feed liquid that had slowly accumulated in the transfer pump's upper, refresh-reservoir portion out through the vapor-chamber base's port 164 (FIG. 14) along a refresh path. As FIG. 14 shows, that is, it flows into ports 132 by way of a check valve 224 provided to prevent recirculation flow from entering the refresh reservoir. With that flow now redirected to the transfer pump's lower side, i.e., to the concentrate reservoir, the resultant rapid flow through the check valve 224 and ports 132 enters the spray arms 58 and scanner 140, replacing the temporarily redirected recirculation flow. All this happens in a very short fraction of the recirculation cycle. In most embodiments, the duration of this refresh cycle will be only on the order of about a second, in contrast to the recirculation cycle, which will preferably be at least fifty times as long, typically lasting somewhere in the range of two to ten minutes.

The effect of thus redirecting the feed and recirculation flows is to replace the rotary heat exchanger's liquid inventory with feed liquid that has not recirculated. As was explained previously, the rotary heat exchanger continuously removes vapor from the evaporation side, leaving impurities behind and sending the vapor to the condensation side. So impurities tend to concentrate in the recirculation flow. Such impurities may tend to deposit themselves on the heat-exchange surfaces. Although the periodic surface flushing that the scanner nozzles perform greatly reduces this tendency, it is still desirable to limit the impurities concentration. One could reduce impurities in a continuous fashion, continuously bleeding off some of the recirculation flow as concentrate exhaust. But the illustrated embodiment periodically replaces essentially the entire liquid inventory on the rotary heat exchanger's evaporation side. This results in an evaporator-side concentration that can average little more than half the exhaust concentration. So less water needs to be wasted, because the exhaust concentration can be higher for a given level of tolerated concentration in the system's evaporator side.

As the transfer-pump piston rises rapidly, it slides FIG. 9's actuator sleeve 206 upward rapidly, too. Eventually, the sleeve begins to compress a further buffer spring 226 against a stop 230 that the actuator rod 208 provides at its upper end. At some point, the resultant upward force on the actuator rod 208 overcomes the restraining force that FIG. 17's valve-actuating spring 212 exerts on it through the spring mount 210, and the actuator rod rises to flip the valve crank 216 back to its upper position and thus return the transfer valve 130 to its normal position, in which the recirculation flow from FIG. 9's scoop tubes 122 and 124 is again directed to the spray arms and scanner. So the unit returns to its normal regime, in which the transfer pump slowly expels concentrate from its concentrate reservoir and draws feed liquid through the feed-liquid storage path to its refresh-liquid reservoir. As FIG. 8 shows, tube 200, counterflow-heat-exchanger module 104, and a further tube 232 guide the concentrate thus expelled along a concentrate-discharge path from manifold outlet 198 to the concentrate outlet 16.

To achieve approximately the same peak concentration in different installations despite differences in those installations' feed-liquid impurity levels, different refresh-cycle frequencies may be used in different installations. And, since the typical feed-liquid impurity level at a given installation may not always be known before the unit is installed-or at least until rather late in the distiller's assembly process-some embodiments may be designed to make that frequency adjustable.

For example, some embodiments may make the piston travel adjustable by, for instance, making the position of a component such as FIG. 9's stop 230 adjustable. In the illustrated embodiment, though, that travel also controls scanner travel, and any travel adjustability would instead be used to obtain proper scanner coverage. So one may instead affect frequency by adjusting the force of FIG. 15's transfer-pump spring 184. This could be done by, for instance, making the piston 182's position on the drive rod 146 adjustable. Refresh-frequency adjustability could also be provided by making the flow resistance of FIG. 8's flow restricter 202 adjustable.

In any case, flow restricter 204, which balances the two counterflow-heat-exchanger flows to match the relative rate of concentrate discharge, would typically also be made adjustable if the refresh-cycle frequency is. The flow restricters could take the form of adjustable bleed valves, for instance.

Having now described the distillation unit's rotary heat exchanger, we will describe one of its counterflow-heat-exchanger modules. Before doing so, though, we return to FIG. 8 to complete the discussion of the fluid circuit in which those modules reside. The flow of purified liquid that issues from FIG. 7's condensate scoop tube 94 is directed to FIG. 8's accumulator 236, which the drawings do not otherwise show. The accumulator 236 receives condensate in a resiliently expandable chamber. The accumulator's output feeds heat-exchanger module 110's hot-water inlet $110_{H\_IN}$ to provide the hot-side flow through the serial combination of heat exchangers 110, 108, 106, and 102. A condensate pump 238 drives this flow. After being cooled by flow through the serial heat-exchanger-module combination, the cooled condensate issues from module 102's "hot"-water outlet $102_{H\_OUT}$ and flows through a pressure-maintenance valve 240 and the concentrate outlet 16. Valve 240 keeps the pressure in the hot sides of counterflow heat exchangers 102, 106, 108, and 110 higher than in their cold sides so that any leakage results in flow from the pure-water side to the dirty-water side and not vice versa.

The main pump 100's drive is controlled in response to a pressure sensor 242, which monitors the rotary heat exchanger's evaporator-side pressure at some convenient point, such as the transfer valve's interior chamber. Finally, to accommodate various leakages, tubes to the drain outlet 18 may be provided from elements such as the pump, pressure-maintenance valve, and sump.

It can be seen from the description so far that the counterflow-heat-exchanger modules 102, 104, 106, and 108 act as a temperature-transition section. The rotary-heat-exchanger part of the fluid circuit is a distiller by itself, but one that relies on a high-temperature input and produces high-temperature outputs. The counterflow-heat-exchanger modules make the transition between those high temperatures and the relatively low temperatures at the feed inlet and condensate and concentrate outlets. The counterflow-heat-exchanger modules in essence form two heat exchangers, which respectively transfer heat from the condensate and concentrate to the feed liquid. We now turn to one example of the simple type of counterflow-heat-exchanger module that this arrangement permits.

Figure 19:
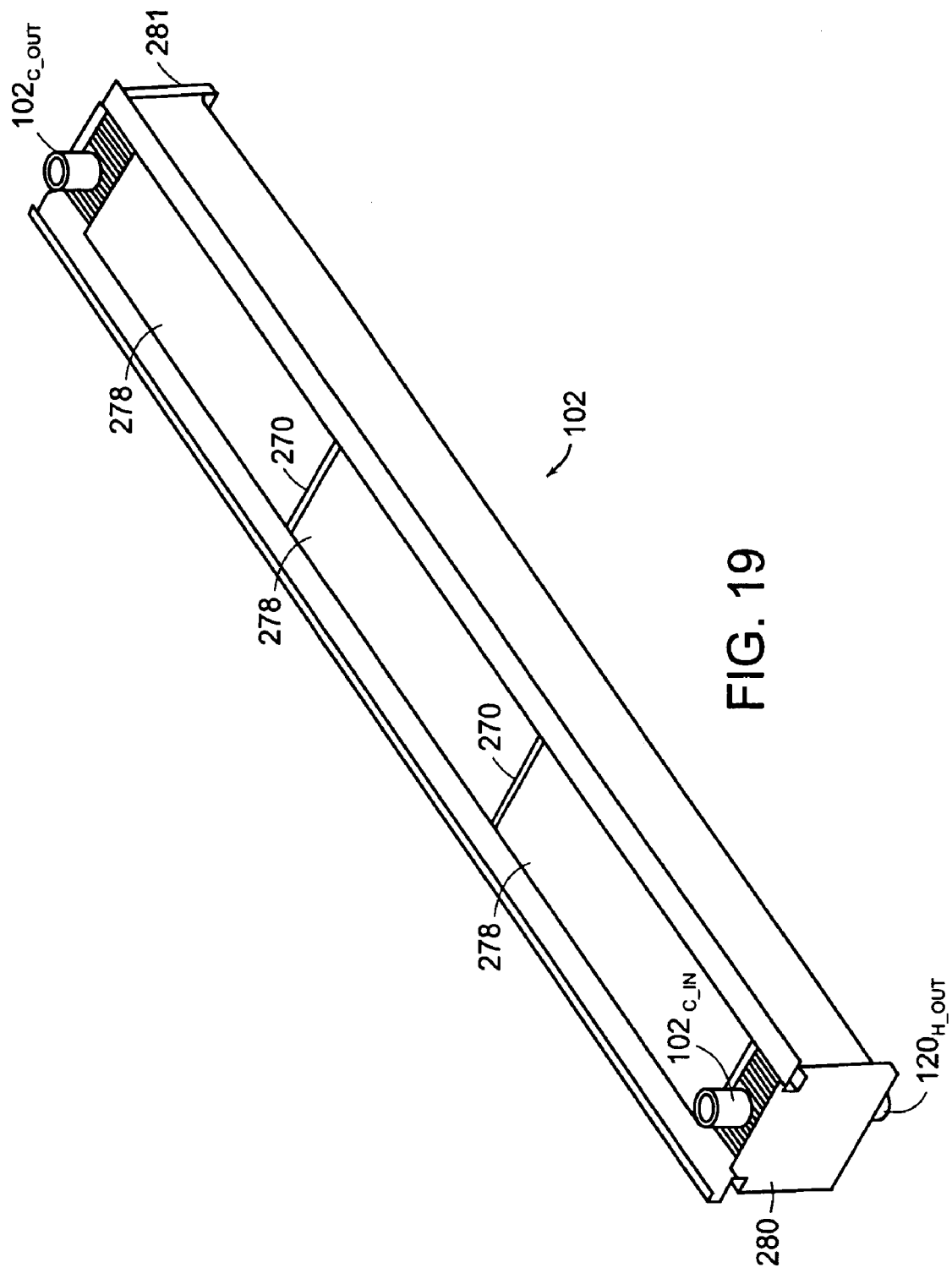
FIG. 19 is an isometric view of one of the distillation unit's counterflow-heat-exchanger modules.
Figure 20:
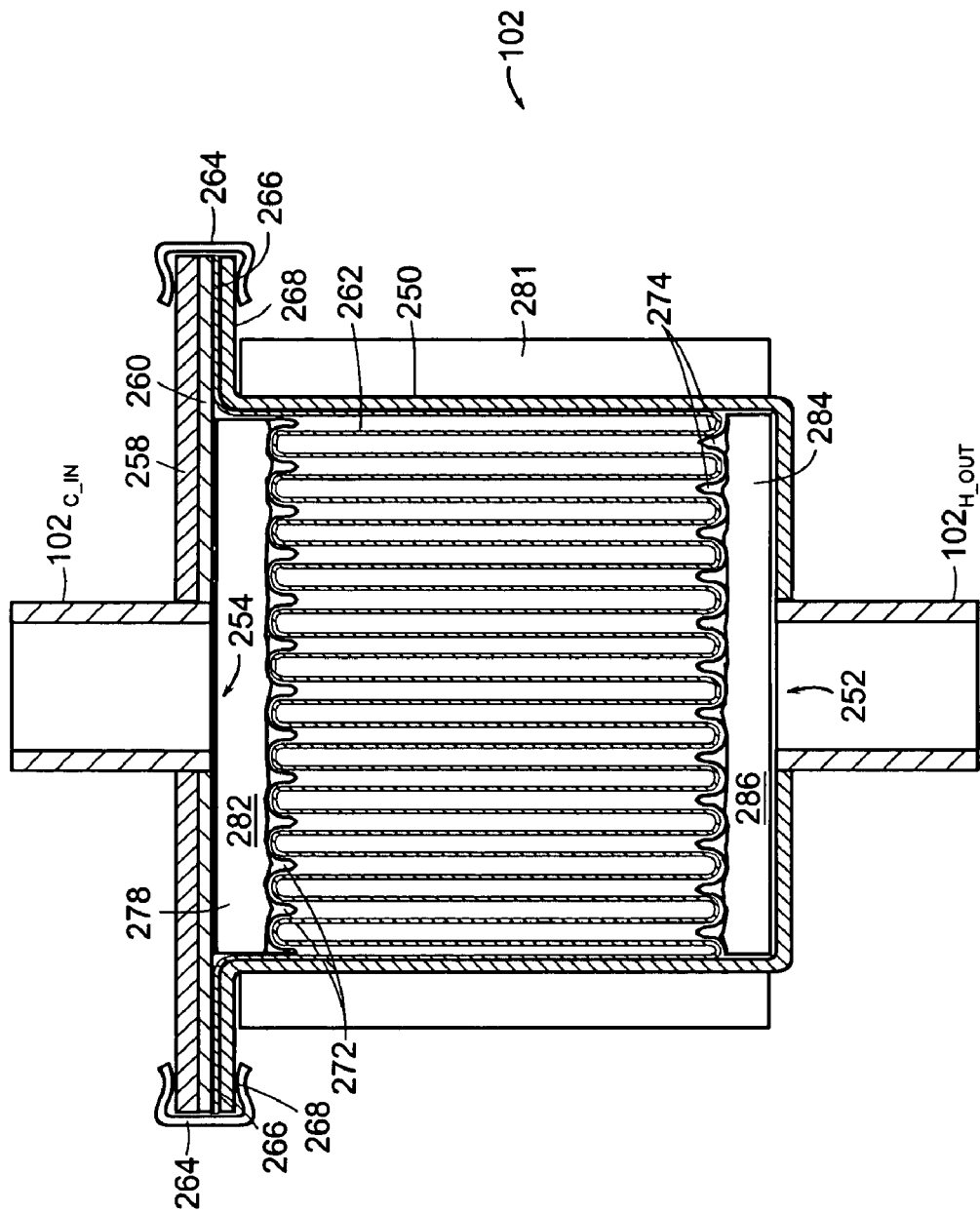
FIG. 20 is a cross-sectional view of that heat-exchanger module.

FIG. 19, which is an isometric view of counterflow heat exchanger 102 with parts removed, shows tubes that provide its cold-water inlets $102_{C\_IN}$ and $102_{C\_OUT}$. It also shows the hot-water outlet $102_{H\_OUT}$ but not the hot-water inlet, which is hidden. FIG. 20 is a cross section taken through the cold-water inlet $102_{C\_IN}$ and the hot-water outlet $102_{H\_OUT}$. That drawing shows that heat exchanger 102 includes a generally U-shaped channel member 250, which provides an opening 252 that communicates with the heat exchanger's "hot"-side outlet. Similar openings 254 in a cover 258 and gasket 260 (both of which FIG. 19 omits) provide the cold-water inlet $102_{C\_IN}$. A folded stainless-steel heat-transfer sheet 262 provides the heat-exchange surfaces that divide the cold-water side from the hot-water side, and elongated clips 264 secure the folded sheet's flanges 266, channel-member flanges 268, cover 258, and cover gasket 260.

As FIG. 19 shows, spacer combs 270 are provided at spaced-apart locations along the heat exchanger's length. One spacer comb 270's teeth 272 are visible in FIG. 20, and it can be seen that the teeth help to maintain proper bend locations in the folded heat-transfer sheet 262. Similar teeth 274 of a similar spacer comb at the opposite side of the heat-transfer sheet 262 also serve to space its bends.

FIG. 19 shows the upper surfaces of diverter gaskets 278, which extend between the upper spacer combs 270 and serve to restrict the cold-water flow to regions close to the folded heat-transfer sheet 262's upper surface. FIG. 19 also shows that the module includes end plates 280 and 281. These end plates cooperate with the channel member 250, the cover 258, and the cover gasket 260 to form a closed chamber divided by the sheet 262. Additionally, the leftmost diverter gasket 278 cooperates with the end plate 280 and the cover 258 and cover gasket 260 to form a plenum 282 (FIG. 20) by which cold water that has entered through port $102_{C\_IN}$ is distributed among the heat-exchange-surface sheet 262's several folds.

End plate 280 similarly cooperates with another diverter gasket 284 (FIG. 20) to form a similar plenum 286 by which water on the hot-water side that has flowed longitudinally along the heat-exchange surfaces issues from the heat exchanger 102 by way of its hot-water outlet $102_{H\_OUT}$. Incoming hot-side water and outgoing cold-side water flow through similar plenums at the other end.

It can be appreciated from the foregoing description that the present invention's teachings can significantly increase an evaporator-and-condenser unit's operating efficiency. It thus constitutes a significant advance in the art.

What is claimed is:

1. For generating vapor from a liquid, a method comprising:
   A) providing a distillation device that includes heat-transfer surfaces, forming at least one condensation chamber and at least one evaporation chamber, by which heat passes from the at least one condensation chamber to the at least one evaporation chamber;
   B) irrigating each said evaporation chamber with a liquid:
      i) at a respective irrigation rate, whose average is a respective average irrigation rate, that so varies as repeatedly to reach a respective peak irrigation rate that is at least twice the respective average irrigation rate;
      ii) in such a manner that liquid in the at least one evaporation chamber absorbs heat from the heat-transfer surfaces and thereby produces vapor; and
   C) so directing the thus-produced vapor into the at least one condensation chamber vapor that the heat-transfer surfaces absorb from the vapor the heat absorbed from the heat-transfer surfaces by the liquid in the at least one evaporation chamber.

2. A method as defined in claim 1 wherein each said evaporation chamber's irrigation rate reaches its peak irrigation rate periodically.

3. A method as defined in claim 1 wherein the method further includes so compressing the vapor directed to the at least one condensation chamber as to make the vapor pressure in the at least one condensation chamber exceed that in the at least one evaporation chamber.

4. A method as defined in claim 3 wherein each said evaporation chamber's irrigation rate reaches its peak irrigation rate periodically.

5. A method as defined in claim 1 wherein:
   A) there is a threshold irrigation rate that if constantly applied would keep the heat-transfer surfaces wetted but below which the heat-transfer surfaces would not remain wetted;
   B) the peak irrigation rate for each said at least one evaporation chamber exceeds that threshold irrigation rate; and
   C) the average irrigation rate for each said at least one evaporation chamber is no more than half that threshold irrigation rate.

6. A method as defined in claim 5 wherein each said at least one evaporation chamber's irrigation rate reaches its peak irrigation rate periodically.

7. A method as defined in claim 5 wherein the method further includes so compressing vapor in the vapor path as to make the vapor pressure in the at least one condensation chamber exceed that in the at least one evaporation chamber.

8. A method as defined in claim 7 wherein each said at least one evaporation chamber's irrigation rate reaches its peak irrigation rate periodically.

* * * * *